United States Patent
Kaneiwa et al.

(10) Patent No.: US 8,304,017 B2
(45) Date of Patent: Nov. 6, 2012

(54) METHOD OF PRODUCING A PATTERNED BIREFRINGENT PRODUCT

(75) Inventors: Hideki Kaneiwa, Minami-ashigara (JP); Ichiro Amimori, Minami-ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 0 days.

(21) Appl. No.: 12/922,995

(22) PCT Filed: Mar. 16, 2009

(86) PCT No.: PCT/JP2009/055569
§ 371 (c)(1),
(2), (4) Date: Sep. 16, 2010

(87) PCT Pub. No.: WO2009/116660
PCT Pub. Date: Sep. 24, 2009

(65) Prior Publication Data
US 2011/0019276 A1    Jan. 27, 2011

(30) Foreign Application Priority Data

Mar. 18, 2008   (JP) .................................. 2008-069827

(51) Int. Cl.
*B29D 11/00*     (2006.01)
(52) U.S. Cl. ....... 427/162; 264/1.34; 264/1.36; 264/1.7; 264/2.6; 427/163.1
(58) Field of Classification Search .................. 427/162, 427/163.1; 264/1.31, 1.34, 1.7, 1.36, 1.38, 264/2.6; 428/1.3, 1.33
See application file for complete search history.

(56) References Cited

U.S. PATENT DOCUMENTS

| | | | |
|---|---|---|---|
| 2006/0177605 A1* | 8/2006 | Lub et al. ...................... 428/1.3 |
| 2006/0278851 A1* | 12/2006 | Ito et al. ................... 252/299.64 |
| 2008/0143926 A1 | 6/2008 | Amimori et al. |
| 2008/0282322 A1 | 11/2008 | Saito |
| 2009/0174857 A1* | 7/2009 | Amimori et al. .............. 349/158 |

FOREIGN PATENT DOCUMENTS

| | | |
|---|---|---|
| CN | 1942789 A | 4/2007 |
| EP | 1 748 306 A1 | 1/2007 |
| EP | 1 900 509 A1 | 3/2008 |
| EP | 1 925 954 A2 | 5/2008 |
| GB | 2 394 718 A | 5/2004 |
| JP | 3-141320 A | 6/1991 |

(Continued)

OTHER PUBLICATIONS

International Search Report (PCT/ISA/210) issued on Jul. 20, 2009, by Japanese Patent Office as the International Searching Authority for International Application No. PCT/JP2009/055569.

(Continued)

*Primary Examiner* — Mathieu D. Vargot
(74) *Attorney, Agent, or Firm* — Buchanan Ingersoll & Rooney PC

(57) ABSTRACT

A method of producing a patterned birefringent product, having at least steps (I) to (III) in this order:
(I) providing a birefringent pattern builder having an optically anisotropic layer containing a polymer having unreacted reactive groups;
(II) heating a region of the birefringent pattern builder; and
(III) subjecting the birefringent pattern builder to a process that reacts at least a part of the unreacted reactive groups in the optically anisotropic layer.

14 Claims, 5 Drawing Sheets

FOREIGN PATENT DOCUMENTS

| | | |
|---|---|---|
| JP | 08-334618 | 12/1996 |
| JP | 2007-001130 | 1/2007 |
| JP | 2007-279129 | 10/2007 |
| JP | 2009-069793 | 4/2009 |
| WO | WO 2005101069 * | 10/2005 |
| WO | WO 2006104252 A2 * | 10/2006 |

OTHER PUBLICATIONS

Van Der Zande et al., "Synthesis, Properties, and Photopolymerization of Liquid-Crystalline Oxetanes: Application in Transflective Liquid-Crystal Displays", Advanced Functional Materials, 2006 (month unknown), pp. 791-798, vol. 16.

Office Action issued in corresponding Chinese Patent Application No. 200980118050.7 dated Mar. 29, 2012 with English Translation.

Notice of Reasons for Rejection issued in corresponding Japanese Patent Application No. 2008-069827 dated Sep. 11, 2012 with English translation.

* cited by examiner (a)

(b)

(c)

(d)

(e)

(f)

(h)

(g)

(i)

(a)

(b)

(c)

(d)

(e)

(f)

(a)

(b)

(c)

(d)

METHOD OF PRODUCING A PATTERNED BIREFRINGENT PRODUCT

TECHNICAL FIELD

The present invention relates to a method of producing a patterned birefringent product and to a patterned birefringent product produced by said method.

BACKGROUND ART

There have been proposed several methods of producing birefringence patterns. JP-A-3-141320 ("JP-A" means unexamined published Japanese patent application) discloses use of a patterned birefringent product possibly visualized as it is held between two polarization plates in a method of recording an image. In JP-A-3-141320, use is made of a technique using a heat mode laser or thermal head to apply heat to the image-forming portion of an anisotropic film, thereby completely or partially reducing the anisotropy.

However, patterns produced by techniques in which birefringence is reduced with heat, as set forth above, all have the drawback of poor heat resistance. That is, there is a risk that when heat is applied to a portion in which birefringence remains, the birefringence of that portion will end up decreasing. JP-A-3-141320 also proposes a technique of lowering the birefringence with light by using a photodecomposing photopolymer or a photoisomerizing polymer. However, the resistance to light of the pattern that is produced by this technique is low, rendering the pattern unsuitable as a birefringence pattern for use in optical elements in particular.

Another technique for producing birefringence patterns has been proposed in the form of the method of applying a coating liquid comprising polymerizable liquid crystals and a polymerization initiator on a support having an alignment film, conducting patterned exposure through a photomask to the coating liquid wherein the liquid crystals are in an aligned state, fixing the alignment of exposed regions by polymerization, applying heat to create an isotropic phase in unexposed regions, and conducting exposure a second time to cause only those regions exposed the first time around to exhibit optical anisotropy (see British Patent No. 2,394,718A, and "Advanced Function Materials", pp. 791-798, 16, 2006). However, in this method, controlling the state of alignment of the liquid crystals prior to fixation requires conducting multiple exposures while carefully controlling the temperature of the overall system, presenting a problem in the form of a demanding manufacturing process.

SUMMARY OF INVENTION

The present invention is to contemplate for providing a method useful in facile production of a high-heat-resistance patterned birefringent product, i.e. an article having patterned birefringence and being high in heat-resistance.

According to the present invention, there is provided the following means:

(1) A method of producing a patterned birefringent product, comprising at least steps (I) to (III) in this order:
(I) providing a birefringent pattern builder having an optically anisotropic layer containing a polymer having unreacted reactive groups;
(II) heating a region of the birefringent pattern builder; and
(III) subjecting the birefringent pattern builder to a process that reacts at least a part of the unreacted reactive groups in the optically anisotropic layer.

(2) The method according to the above (1), wherein the optically anisotropic layer has a retardation disappearance temperature in a temperature region higher than 20° C., where the retardation disappearance temperature being a temperature at which an in-plane retardation is 30% or less of an in-plane retardation at 20° C., and the temperature at the heating in the step (II) is equal to or higher than the retardation disappearance temperature.

(3) The method according to the above (1) or (2), wherein the heating is performed by a contact of a heating body.

(4) The method according to any one of the above (1) to (3), wherein the process in the step (III) is exposure.

(5) The method according to any one of the above (1) to (3), wherein the process in the step (III) is a heating treatment.

(6) The method according to the above (5), wherein the optically anisotropic layer has a retardation disappearance temperature in a temperature region higher than 20° C., where the retardation disappearance temperature being a temperature at which an in-plane retardation is 30% or less of an in-plane retardation at 20° C., and the heating treatment in the step (III) is performed at a temperature lower than the retardation disappearance temperature.

(7) The method according to any one of the above (1) to (6), wherein the step (III) is followed by a step of performing a finishing heat treatment of the birefringent pattern builder.

(8) The method according to any one of the above (1) to (7), wherein the optically anisotropic layer in the step (I) is a layer formed by coating and drying a solution including a liquid crystalline compound having at least one kind of reactive group, to thereby form a liquid crystal phase, and then polymerizing and fixing the compound by applying heat or irradiating ionizing radiation.

(9) The method according to the above (8), wherein the liquid crystalline compound has two or more kinds of reactive groups having different polymerization conditions.

(10) The method according to the above (8), wherein the liquid crystalline compound at least has a radically reactive group and a cationically reactive group.

(11) The method according to the above (10), wherein the radically reactive group is an acrylic group and/or a methacrylic group, and the cationically reactive group is a vinyl ether group, an oxetanyl group, and/or an epoxy group.

(12) The method according to the above (10) or (11), wherein the birefringent pattern builder in the step (I) comprises:
the optically anisotropic layer formed by coating a solution including the liquid crystalline compound having at least one kind of reactive group and only a radical photo-polymerization initiator as a photoreactive polymerization initiator, to thereby form a liquid crystal phase, and then polymerizing and fixing the compound by applying heat or irradiating ionizing radiation; and
a functional layer provided by directly coating a solution including a cationic photo-polymerization initiator, on the optically anisotropic layer.

(13) The method according to the above (10) or (11), wherein the birefringent pattern builder in the step (I) comprises:
the optically anisotropic layer formed by coating a solution including the liquid crystalline compound having at least one kind of reactive group and only a cationic photo-polymerization initiator as a photoreactive polymerization initiator, to thereby form a liquid crystal phase, and then polymerizing and fixing the compound by applying heat or irradiating ionizing radiation; and a functional layer provided by directly coating a solution including a radical photo-polymerization initiator, on the optically anisotropic layer.

(14) The method according to any one of the above (1) to (7), wherein the optically anisotropic layer is a stretched film.

(15) The method according to any one of the above (1) to (14), wherein the step (I) is performed by transferring a transferring material including an optically anisotropic layer, over a target material of transfer, to prepare the birefringent pattern builder.

(16) The method according to the above (15), wherein the transferring material includes a temporary support, an optically anisotropic layer, and an adhesive layer for transfer, in this order.

(17) A product used as a means of preventing forgery, which is obtainable from the method according to any one of the above (1) to (16).

(18) A product used as an optical element, which is obtainable from the method according to any one of the above (1) to (16).

ADVANTAGEOUS EFFECTS OF INVENTION

By the method of the present invention and the builder according to the present invention, a patterned birefringent product high in heat-resistance can be obtained. The birefringence pattern is readily pattern-identifiable when observed through a polarizing plate, whereas it is almost transparent and colorless when observed through no polarizing plate, and the birefringence pattern is effective for preventing forgery and for imparting visual effects. In particular, it is possible to reduce the number of production steps and thus the production cost if such a transferring material is used.

MODE FOR CARRYING OUT INVENTION

Some examples of preferable modes of the present invention are described below in detail.

In the present specification, "to" denotes a range including numerical values described before and after it as a minimum value and a maximum value.

Herein, in the present specification, the term "retardation" or "Re" means an in-plane retardation, and the term "Re($\lambda$)" indicates an in-plane retardation at wavelength $\lambda$ (nm). The in-plane retardation (Re($\lambda$)) can be measured by making light of wavelength $\lambda$ nm incident in the direction of the normal of the film, in KOBRA 21ADH or WR (each trade name, manufactured by Oji Scientific Instruments). In the present specification, retardation or Re means one measured at wavelength $\lambda$ 611±5 nm for R (Red), 545±5 nm for G (Green), or 435±5 nm for B (Blue), respectively, and denotes one measured at wavelength $\lambda$ 545±5 nm or 590±5 nm unless otherwise specified any of color.

It is to be noted that, regarding angles, the term "substantially" in the context of this specification means that a tolerance of less than ±5° with respect to the precise angles can be allowed. Difference from the precise angles is preferably less than 4°, and more preferably less than 3°. It is also to be noted that, regarding retardation values, the term "substantially" in the context of the specification means that a tolerance of less than 15% with respect to the precise values can be allowed. It is also to be noted that the term "The Re value is substantially not zero" in the context of the specification means that the Re value is not less than 5 nm. The measurement wavelength for refractive indexes is any visible light wavelength, unless otherwise specified. It is also to be noted that the term "visible light" in the context of the specification means light of a wavelength falling within the range from 400 to 700 nm.

In the specification, "retardation disappearance temperature" means a temperature at which the retardation of the optically anisotropic layer becomes 30% or lower of the retardation at 20° C. of the same optically anisotropic layer when the temperature of the optically anisotropic layer is increased at the rate of 20° C./minute from the state of 20° C.

(Birefringent Pattern Builder)

FIGS. 1(a) to 1(i) are schematic sectional views showing several examples of the birefringent pattern builder. The birefringent pattern builder is a material for preparing birefringence pattern, and a material with which the patterned birefringent product can be prepared by conducting the predetermined steps. The birefringent pattern builder may generally have a planar (or film-like or sheet-like) shape. The term "a region of a birefringent pattern builder" means a part of the regions divided by planes parallel to the normal direction of the birefringent pattern builder plane. The individual regions may be in a continuous or discontinuous state or shape.

The birefringent pattern builder shown in FIG. 1(a) is an example having an optically anisotropic layer 12 on a support (substrate) 11. The birefringent pattern builder shown in FIG. 1(b) is an example having an alignment layer 13. The alignment layer 13 functions as a layer for supporting the alignment/orientation of liquid crystalline compounds, when use is made, as the optically anisotropic layer 12, of a layer formed by coating a substrate with a solution comprising the liquid crystalline compounds and drying the solution to thereby form a liquid crystal phase, and then polymerizing and fixing the compounds by applying heat or irradiating ionizing radiation to the liquid crystal phase.

The birefringent pattern builder shown in FIG. 1(c) is an example further having a reflective layer 35 on the support 11. The birefringent pattern builder shown in FIG. 1(d) is an example further having the reflective layer 35 under the support 11. The birefringent pattern builder shown in FIG. 1(e) is an example having a post-adhesive layer 16 (which is a layer functions as an adhesive when attached to a subject 'another product' after peeling off the below-mentioned delamination layer from the resultant laminated structure) and a delamination layer 17 (which is a layer that can be delaminated or peeled off from the laminated structure) under the support 11, in order to be attached to another product after forming the birefringence pattern. The birefringent pattern builder shown in FIG. 1(f) is an example having an adhesive layer 14 for transfer between the support 11 and the optically anisotropic layer 12 as it is prepared by using a transferring material. The birefringent pattern builder shown in FIG. 1(g) is an example having plural optically anisotropic layers (12F, 12S). The birefringent pattern builder shown in FIG. 1(h) is an example having a reflective layer 35 under a self-supporting optically anisotropic layer 12. The birefringent pattern builder shown in FIG. 1(i) is an example having the post-adhesive layer 16 and the delamination layer 17 under the reflective layer 35 in order to be attached to another product after forming the birefringence pattern.

(Birefringent Pattern Builder to be Used as Transferring Material)

FIGS. 2(a) to 2(f) are schematic sectional views showing several examples of the birefringent pattern builder that can be used as a transferring material in the present invention. By using the birefringent pattern builder as a transferring material, a birefringent pattern builder having an optically anisotropic layer on a desired support, a birefringent pattern builder having plural optically anisotropic layers, or a product having plural layers having birefringence pattern, can be readily formed.

The birefringent pattern builder shown in FIG. 2(a) is an example having an optically anisotropic layer 12 on a temporary support 21. The birefringent pattern builder shown in FIG. 2(b) is an example further having an adhesive layer 14 for transfer on the optically anisotropic layer 12. The birefringent pattern builder shown in FIG. 2(c) is an example further having a surface-protecting layer 18 on the adhesive layer 14 for transfer. The birefringent pattern builder shown in FIG. 2(d) is an example further having an alignment layer 22 on temporary support between the temporary support 21 and the optically anisotropic layer 12. The birefringent pattern builder shown in FIG. 2(e) is an example having further a dynamic-property-controlling layer 23 between the temporary support 21 and the alignment layer 22 on the temporary support. The birefringent pattern builder shown in FIG. 2(f) is an example having plural optically anisotropic layers (12F, 12S).

(Patterned Birefringent Product)

Herein, the term "patterned birefringent product" or "product having a birefringence pattern" in the present specification means a product having two or more regions different in birefringence. The patterned birefringent product more preferably has three or more regions different in birefringence. The regions having the birefringence equal to each other may be arranged in a continuous or discontinuous state or shape. The birefringent pattern may generally have a planar (film-like or sheet-like) shape. Regions having different birefringences are preferably regions divided by planes parallel to the normal direction of the plane of the birefringent pattern.

FIGS. 3(a) to 3(d) are schematic sectional views showing several examples of the patterned birefringent product which can be obtained by the production method of the present invention using the birefringent pattern builder. The patterned birefringent product obtainable by the method of the present invention has at least one layer of patterned optically anisotropic layer 112. In the present specification, the term "patterned optically anisotropic layer" means "an optically anisotropic layer having regions different in birefringence from each other in a patterned manner".

The patterned birefringent product shown in FIG. 3(a) is an example consisting of only one patterned optically anisotropic layer 112. The patterned birefringent product prepared by the production method of the present invention has a non-heated part and a heated part. The non-heated part and the heated part have different birefringences to each other (further, the heated part may include a plurality of heated parts which are heated under different heating conditions to each other so as to have different birefringences to each other). The example shown in FIG. 3(a) is an example in which the patterned birefringent product has a heated part 112-A and a non-heated part 112-B. The patterned birefringent product shown in FIG. 3(b) is an example having a support 11, and a reflective layer 35, an adhesive layer 14 for transfer, and a patterned optically anisotropic layer 112, each of which is provided on the support in that order from the support. The patterned birefringent product may have a plurality of patterned optically anisotropic layers, and thus, can exhibit a variety of additional functions with the plural optically anisotropic layers. The patterned birefringent product shown in FIG. 3(c) is an example in which plural optically anisotropic layer are laminated and thereafter regions of the layers are subjected to local heatings (hereinafter, also referred to as "partial heating"), to give the same patterns to each layer. Such a product is useful, for example, in producing a pattern containing a region having a large retardation that is not possible with only one optically anisotropic layer. The patterned birefringent product shown in FIG. 3(d) is an example in which the step of "formation of an optically anisotropic layer (including formation by transferring)", the step of "local heating", and the step of "exposure of the entire surface" are repeated a plurality of times in this order to give independent patterns to a plurality of optically anisotropic layers. Such a configuration is useful, for example, if patterns independent of each other are desirably formed on two or more optically anisotropic layers different in retardation or in direction of slow axis from each other.

Hereinafter, description will be made in detail on the birefringent pattern builder, the method of producing a patterned birefringent product using the same, materials of the patterned birefringent product, the method of producing the same, and the like. However, it is to be noted that the present invention is not limited to the embodiments below. Any other embodiments can be also carried out referring to the description below and known methods.

(Optically Anisotropic Layer)

The optically anisotropic layer in the birefringent pattern builder is the layer having at least one incident direction, of which retardation (Re) is not substantively zero when a phase difference is measured. In other words, the optically anisotropic layer is the layer which has non-isotropic optical characteristic.

The optically anisotropic layer in the birefringent pattern builder contains a polymer having unreacted reactive groups. The term "unreacted reactive group" means a reactive group and is a concept including an unreacted reactive group left after a polymer is prepared from a monomer (having a reactive group). By containing polymer, the optically anisotropic layer can meet various requirements such as birefringence, transparency, solvent-resistance, toughness, and flexibility. The retardation of optically anisotropic layer changes by heating. Especially, in the case where the optically anisotropic layer has a retardation disappearance temperature, the retardation of the layer significantly lowers when it is heated to a temperature higher than the retardation disappearance temperature. Therefore, by heating a region of the optically anisotropic layer, it is possible to temporarily impart a difference in retardation between the heated region and the non-heated region. Further, because the optically anisotropic layer of the present invention has unreacted reactive groups, it is possible to fix the difference in retardation by subjecting the layer to a treatment, such as exposure to light, so as to cause reaction of the unreacted reactive groups, and thereby crosslinking the polymer chains.

The optically anisotropic layer may be solid at 20° C., preferably at 30° C., and more preferably at 40° C., because an optically anisotropic layer which is solid at 20° C. can readily be applied with another functional layer, or transferred or attached to a support.

In order to be applied with another functional layer, the optically anisotropic layer is preferred to have solvent-resistance. In the specification, "to have solvent-resistance" means that the retardation of the layer after soaked in the subject solvent for two minutes is in the range of 30 to 170%, more preferably 50 to 150%, most preferably 80 to 120%, with respect to the retardation of the layer before the soaking. As the subject solvent, examples include water, methanol, ethanol, isopropanol, acetone, methylethylketone, cyclohexanone, propyleneglycolmonomethyletheracetate, methylpyrrolidone, hexane, chloroform, and ethyl acetate. Among them, acetone, methylethylketone, cyclohexanone, propyleneglycolmonomethyletheracetate, and N-methylpyrrolidone are preferable, and methylethylketone, cyclohexanone, and propyleneglycolmonomethyletheracetate, and a mixture thereof are most preferable.

The retardation of the optically anisotropic layer at 20° C. may be 5 nm or more, preferably 10 nm or more and 10,000 nm or less, and more preferably 20 nm or more and 2,000 nm or less. When the retardation is too small, formation of birefringence pattern may become difficult. When the retardation is too large, error becomes larger and it may become difficult to achieve practically needed accuracy.

The production method of the optically anisotropic layer is not particularly limited. Examples include a method of conducting coating a solution comprising a liquid crystalline compound having at least one reactive group and drying the solution to thereby form a liquid crystal phase, and then applying heat or irradiating ionizing radiation for polymerization and fixation; a method of stretching a layer formed by polymerizing and fixing a monomer having two or more reactive groups; a method of stretching a layer consisting of polymer, after a reactive group is being introduced to the layer by using a coupling agent; and a method of stretching a layer consisting of polymer and then introducing a reactive group to the layer by using a coupling agent.

Further, as explained below, the optically anisotropic layer according to the present invention may be formed by transfer.

The thickness of the optically anisotropic layer is preferably 0.1 to 20 μm, and more preferably 0.5 to 10 μm.

(Optically Anisotropic Layer Formed by Polymerizing and Fixing Composition Comprising Liquid Crystalline Compound)

The production method of the optically anisotropic layer is explained below, wherein coating with a solution comprising a liquid crystalline compound having at least one reactive group is conducted and the solution is dried to thereby form a liquid crystal phase, and then the liquid crystal phase is polymerized and fixed by applying heat or irradiating ionizing radiation. With this method, it is easy to obtain an optically anisotropic layer which is thinner in thickness but has an equal retardation compared with the layer obtainable by the method of forming an optically anisotropic layer by stretching of polymer, which method will be explained later.

(Liquid-Crystalline Compound)

The liquid-crystalline compounds can generally be classified by molecular geometry into rod-like one and discotic one. Each category further includes low-molecular type and high-molecular type. The high-molecular type generally refers to that having a degree of polymerization of 100 or above ("Kobunshi Butsuri-Soten'i Dainamikusu (Polymer Physics-Phase Transition Dynamics), by Masao Doi, p. 2, published by Iwanami Shoten, Publishers, 1992). Either type of the liquid-crystalline molecule may be used in the present invention, wherein it is preferable to use a rod-like liquid-crystalline compound or a discotic liquid-crystalline compound. A mixture of two or more kinds of rod-like liquid-crystalline compounds, a mixture of two or more kinds of discotic liquid-crystalline compounds, or a mixture of a rod-like liquid-crystalline compound and a discotic liquid-crystalline compound may also be used. It is more preferable that the optically anisotropic layer is formed using a composition comprising the rod-like liquid-crystalline compound having a reactive group or the discotic liquid-crystalline compound having a reactive group, because such compound can reduce temperature- or moisture-dependent changes; and it is still further preferable that at least one compound in the mixture has two or more reactive groups in a single liquid-crystalline molecule. The liquid-crystalline composition may be a mixture of two or more kinds of compounds, wherein at least one of the compounds preferably has two or more reactive groups.

It is also preferred that liquid-crystalline compound have two or more kinds of reactive groups which have different polymerization condition to each other. In such case, an optically anisotropic layer comprising polymer having unreacted reactive group can be produced by only polymerizing one type of reactive groups among plural types of reactive groups by selecting polymerization condition. The polymerization condition may be wavelength range of the irradiation of ionizing radiation at the time of polymerizing and fixing, or mechanism of polymerization. Preferably, the condition may be polymerization initiator, which can control polymerization of compound having a combination of a radically reactive group and a cationically reactive group. The combination of acrylic group and/or methacrylic group as the radically reactive group and vinyl ether group, oxetanyl group, and/or epoxy group as the cationically reactive group is particularly preferred, because the reactivity can be controlled readily.

Examples of the rod-like liquid-crystalline compound include azomethine compounds, azoxy compounds, cyanobiphenyl compounds, cyanophenyl esters, benzoate esters, cyclohexanecarboxylic acid phenyl esters, cyanophenylcyclohexane compounds, cyano-substituted phenylpyrimidine compounds, alkoxy-substituted phenylpyrimidine compounds, phenyldioxane compounds, tolan compounds, and alkenylcyclohexylbenzonitrile compounds. Not only the low-molecular-weight liquid-crystalline compounds as listed in the above, high-molecular-weight liquid-crystalline compounds may also be used. High-molecular-weight liquid-crystalline compounds may be obtained by polymerizing low-molecular-weight liquid-crystalline compounds having at least one reactive group. Among such low-molecular-weight liquid-crystalline compounds, liquid-crystalline compounds represented by formula (I) are preferred.

$$Q^1\text{-}L^1\text{-}A^1\text{-}L^3\text{-}M\text{-}L^4\text{-}A^2\text{-}L^2\text{-}Q^2 \qquad \text{Formula (I)}$$

In formula (I), $Q^1$ and $Q^2$ each independently represent a reactive group; $L^1$, $L^2$, $L^3$ and $L^4$ each independently represent a single bond or a divalent linking group; $A^1$ and $A^2$ each independently represent a spacer group having 2 to 20 carbon atoms; and M represents a mesogen group.

Hereinafter, the rod-shaped liquid crystalline compound having a reactive group represented by Formula (I) will be described in more detail. In formula (I), $Q^1$ and $Q^2$ each independently represent a reactive group. The polymerization reaction of the reactive group is preferably addition polymerization (including ring opening polymerization) or condensation polymerization. In other words, the reactive group is preferably a functional group capable of addition polymerization reaction or condensation polymerization reaction. Examples of reactive groups are shown below.

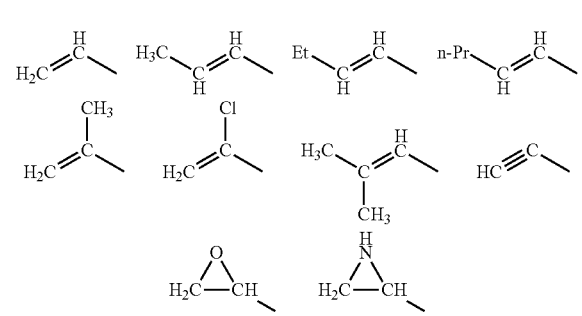

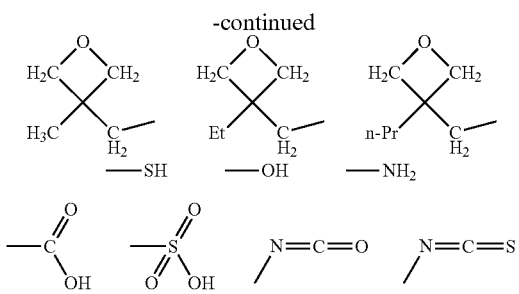

The divalent linking groups represented by $L^1$, $L^2$, $L^3$ and $L^4$ are preferably those selected from the group consisting of —O—, —S—, —CO—, —NR$^2$—, —CO—O—, —O—CO—O—, —CO—NR$^2$—, —NR$^2$—CO—, —O—CO—, —O—CO—NR$^2$—, —NR$^2$—CO—O— and —NR$^2$—CO—NR$^2$—. $R^2$ represents an alkyl group having 1 to 7 carbon atoms or a hydrogen atom. Of the groups represented by a combination of $Q^1$ and $L^1$, or of $Q^2$ and $L^2$, $CH_2$=CH—CO—O—, $CH_2$=C(CH$_3$)—CO—O—, and $CH_2$=C(Cl)—CO—O— are preferable, and $CH_2$=CH—CO—O— is most preferable.

$A^1$ and $A^2$ each are a spacer group having 2 to 20 carbon atoms, preferably an alkylene, alkenylene or alkynylene group having 2 to 12 carbon atoms; and particularly preferably an alkylene group. The spacer group is more preferably has a chain form, and may contain non-neighboring oxygen atoms or sulfur atoms. The spacer group may have a substituent group such as a halogen atom (fluorine, chlorine, bromine), a cyano group, a methyl group or an ethyl group.

The mesogen group represented by M may be selected from any known mesogen groups, and is preferably selected from the group represented by the formula (II).

$$-(-W^1-L^5)_n-W^2-\qquad \text{Formula (II)}$$

In formula (II), each of $W^1$ and $W^2$ represent a divalent cyclic alkylene or alkenylene group, a divalent arylene group, or a divalent hetero-cyclic group; and $L^5$ represents a single bond or a linking group. Examples of the linking group represented by $L^5$ include those exemplified as examples of $L^1$ to $L^4$ in the formula (I) and —CH$_2$—O— and —O—CH$_2$—. In formula (II), n is 1, 2 or 3.

Examples of $W^1$ and $W^2$ include 1,4-cyclohexanediyl, 1,4-phenylene, pyrimidine-2,5-diyl, pyridine-2,5-diyl, 1,3,4-thiazole-2,5-diyl, 1,3,4-oxadiazole-2,5-diyl, naphtalene-2,6-diyl, naphtalene-1,5-diyl, thiophen-2,5-diyl, pyridazine-3,6-diyl. As for 1,4-cyclohexane diyl, either structural isomers having trans-form or cis-form, or any mixture based on an arbitrary compositional ratio may be used in the present invention, where the trans-form is preferable. Each of $W^1$ and $W^2$ may have a substituent, where the examples of the substituent include halogen atoms (fluorine, chlorine, bromine, iodine), cyano group, alkyl groups having 1 to 10 carbon atoms (methyl, ethyl, propyl, etc.), alkoxy groups having 1 to 10 carbon atoms (methoxy, ethoxy, etc.), acyl group having 2 to 10 carbon atoms (formyl, acetyl, etc.), alkoxycarbonyl group having 2 to 10 carbon atoms (methoxycarbonyl, ethoxycarbonyl, etc.), acyloxy groups having 2 to 10 carbon atoms (acetyloxy, propionyloxy, etc.), nitro group, trifluoromethyl group and difluoromethyl group.

Basic skeletons of the most preferable examples of the mesogen group represented by formula (II) are listed below. These groups may further be substituted by the above-described substituents.

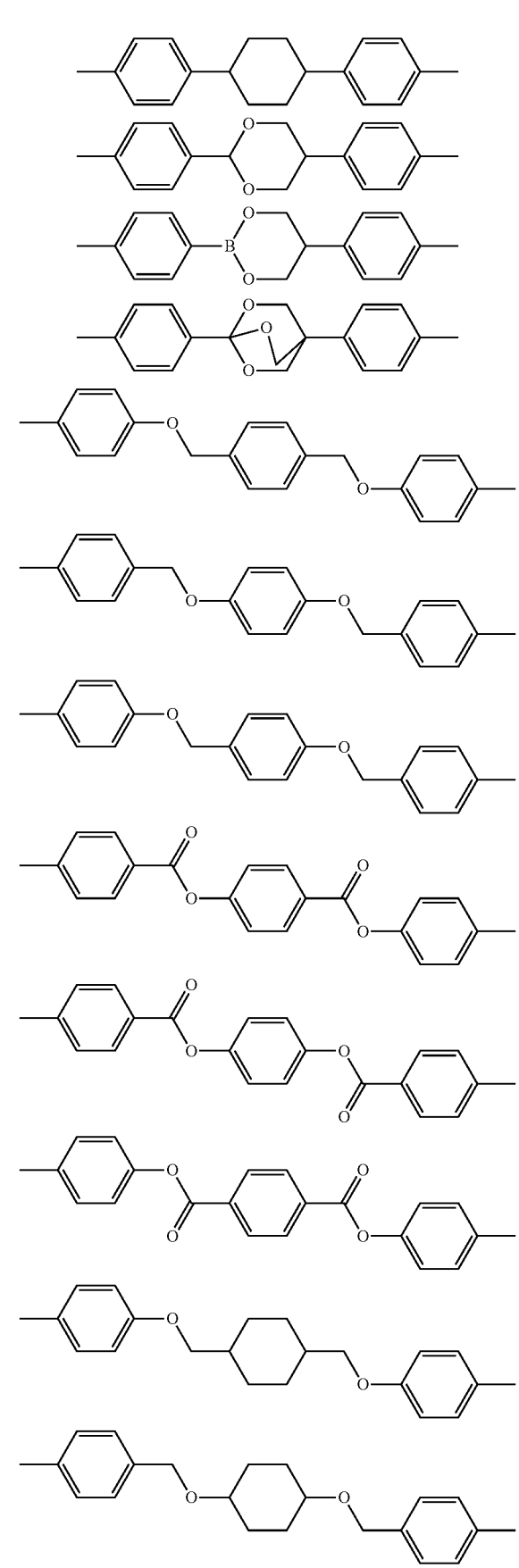

11
-continued
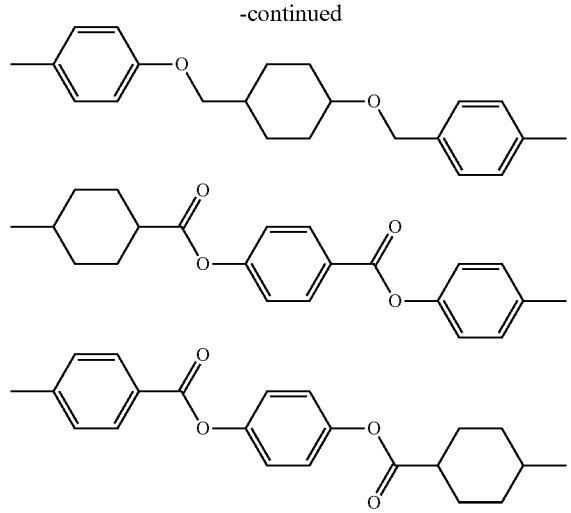
12
-continued
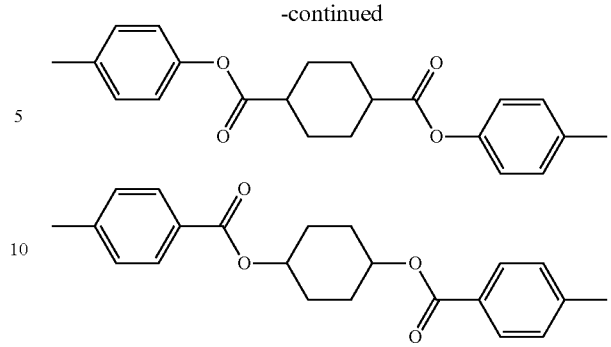
Examples of the compound represented by formula (I) include, but not to be limited to, those described below. The compounds represented by formula (I) may be prepared according to a method described in JP-T-11-513019 ("JP-T" means a published Japanese translation of PCT international application) (WO97/00600).
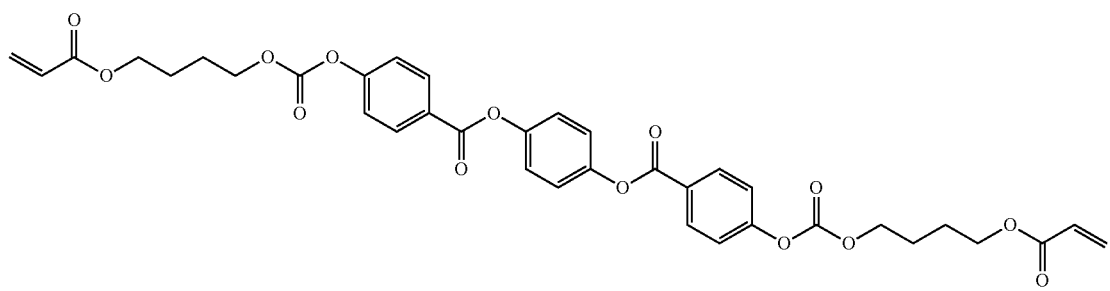
I-1
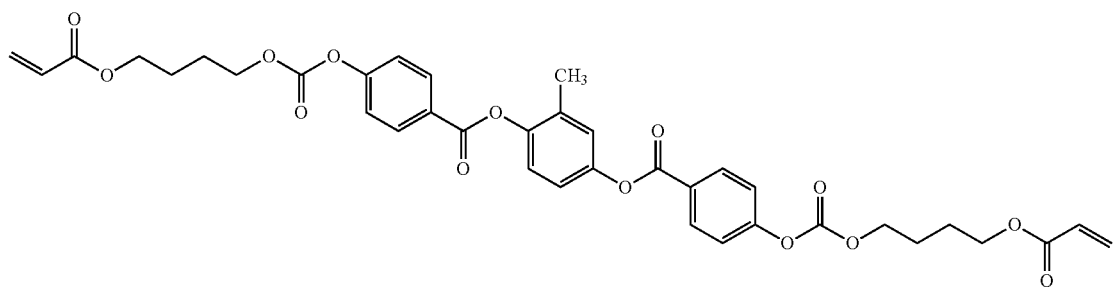
I-2
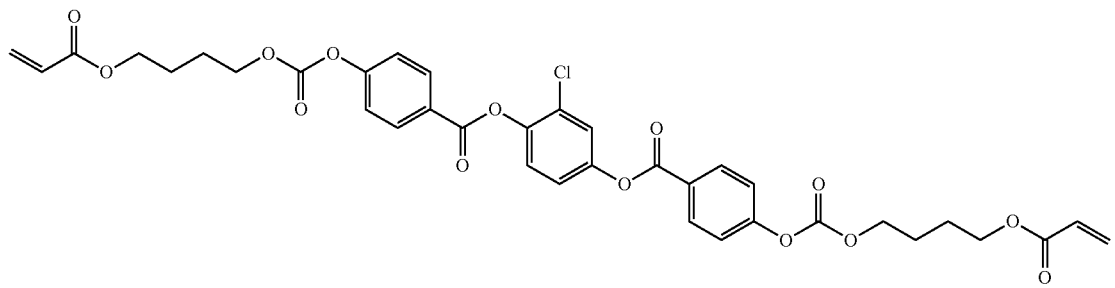
I-3

-continued
I-4
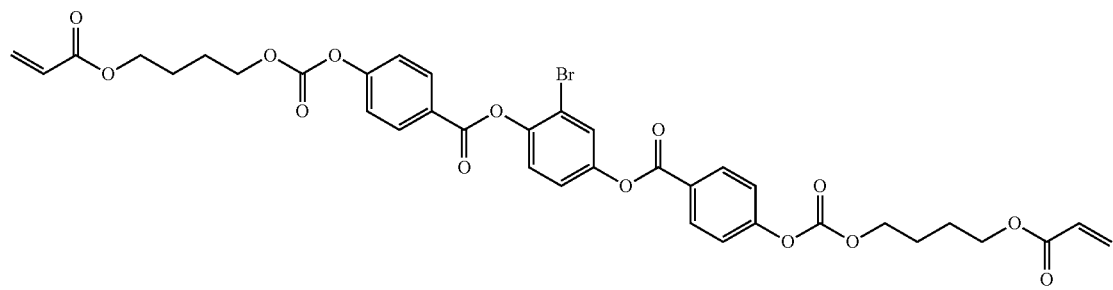
I-5
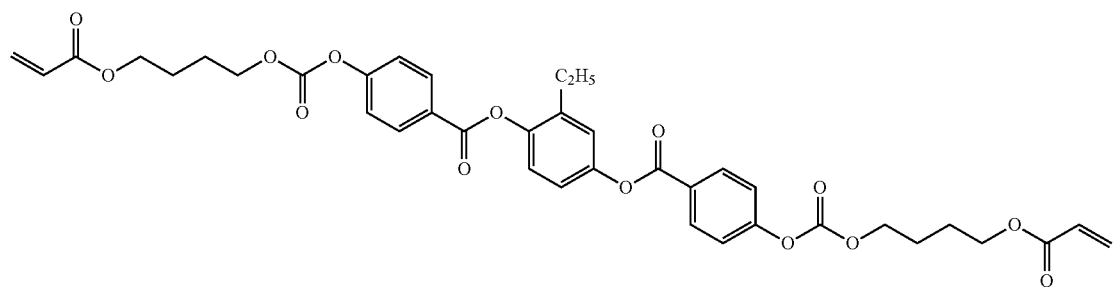
I-6
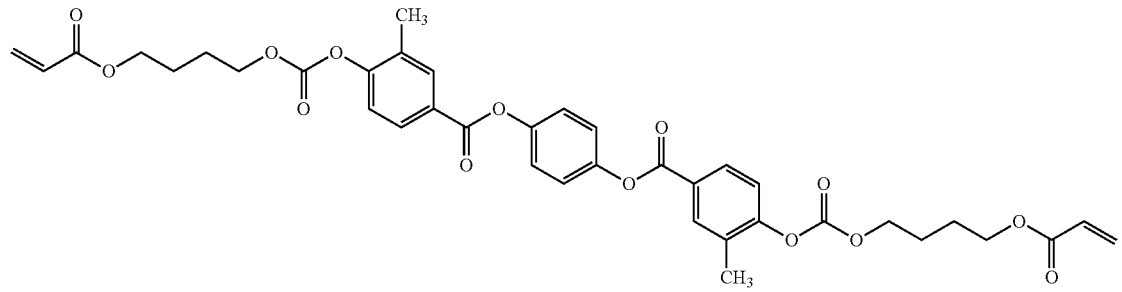
I-7
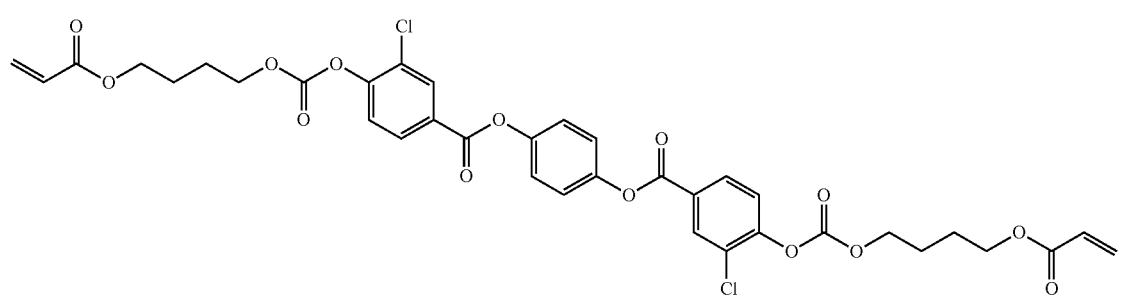
I-8
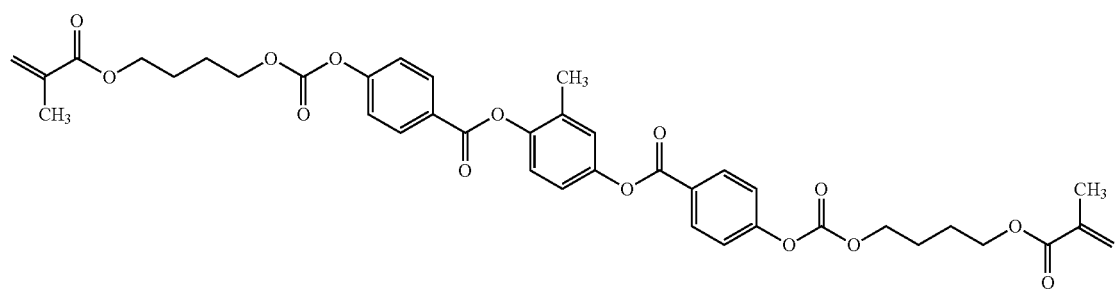

-continued
I-9
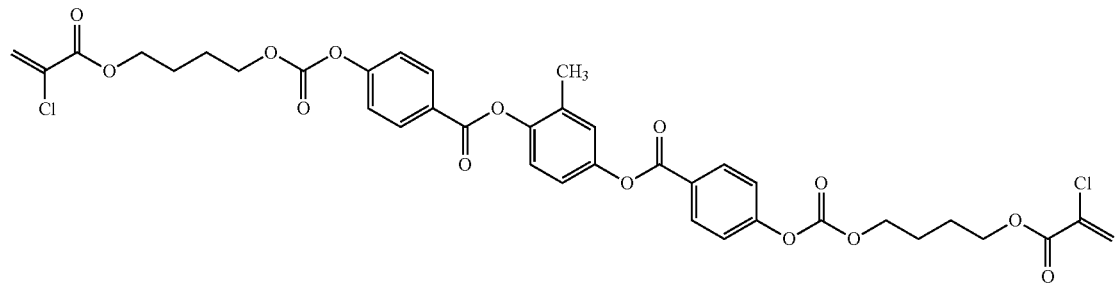
I-10
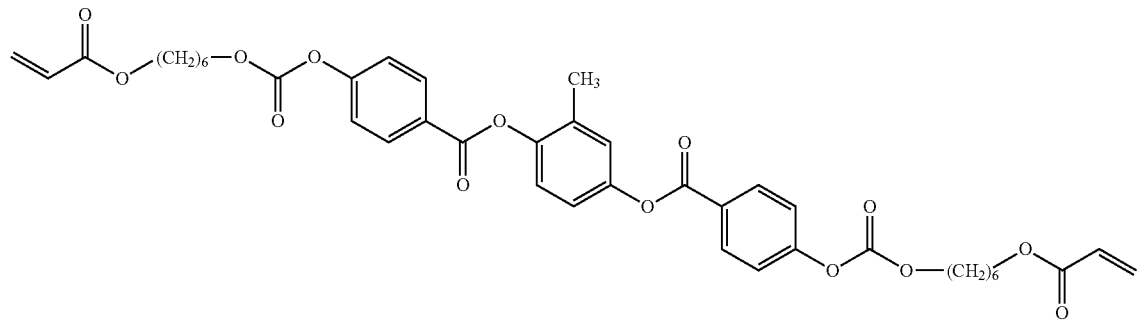
I-11
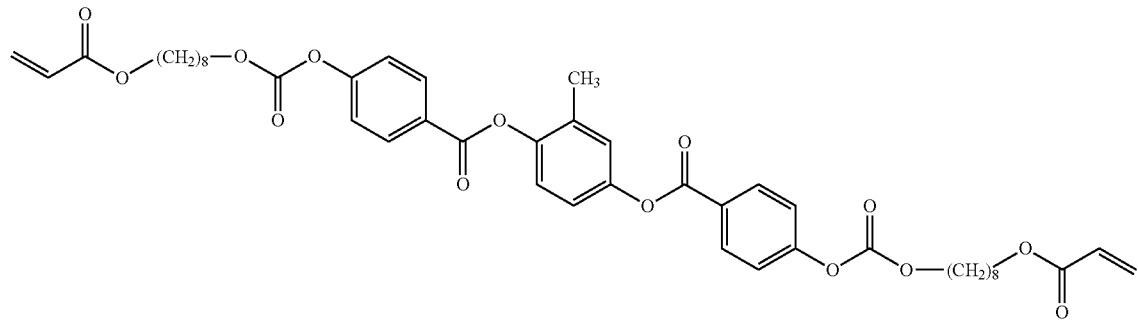
I-12
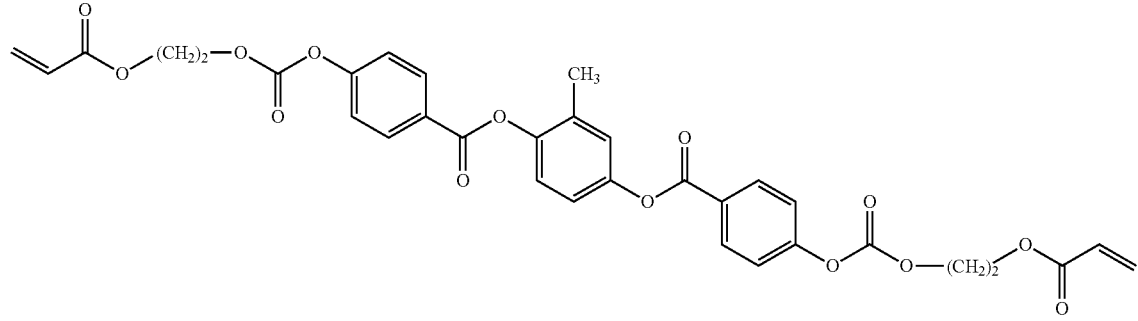
I-13
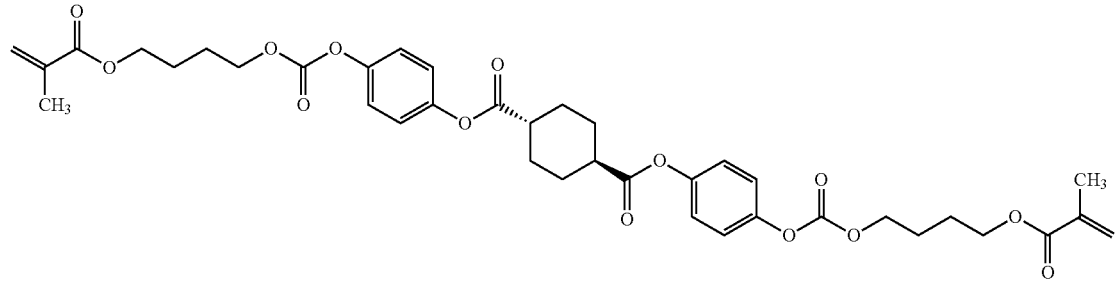

-continued
I-14
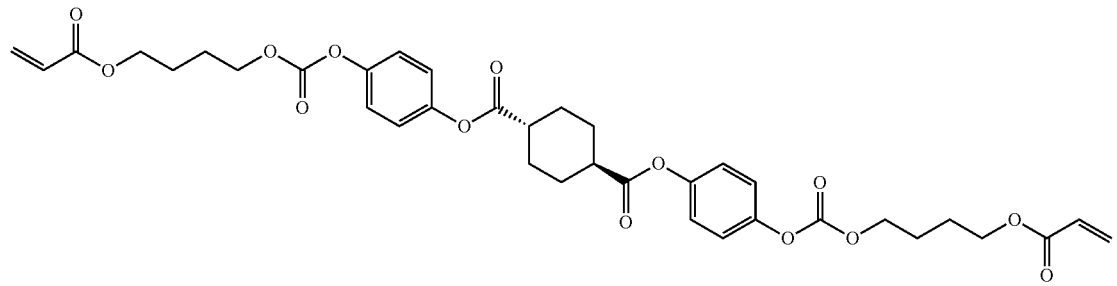
I-15
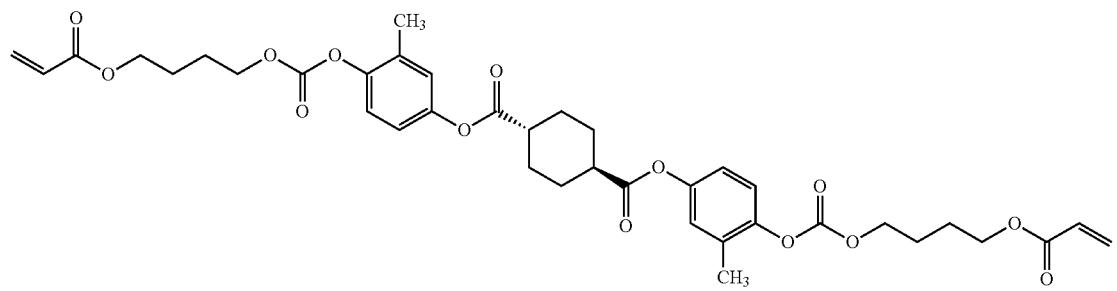
I-16
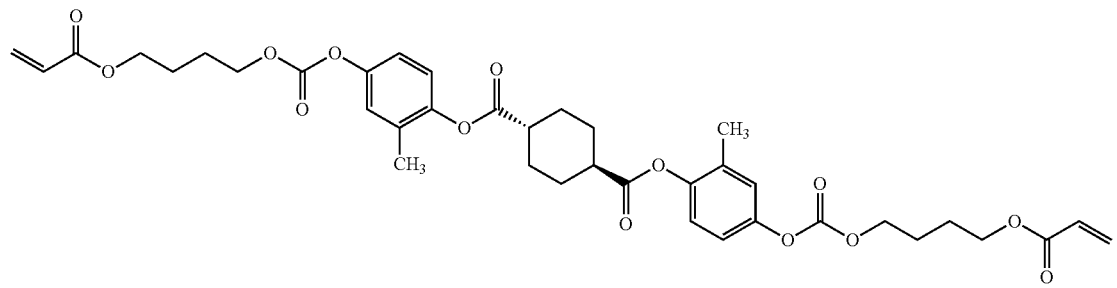
I-17
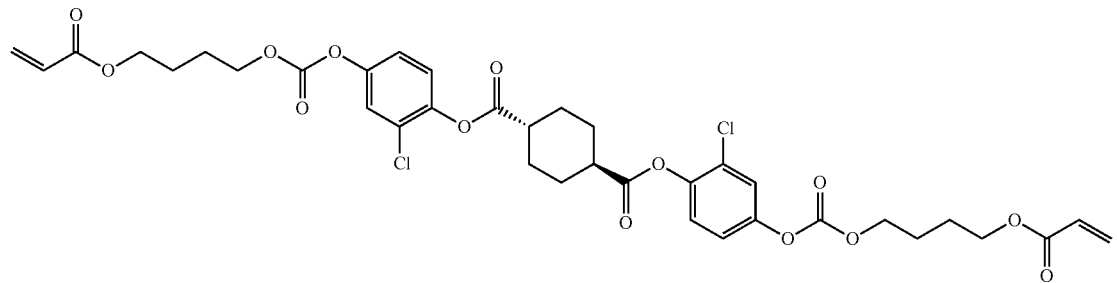
I-18
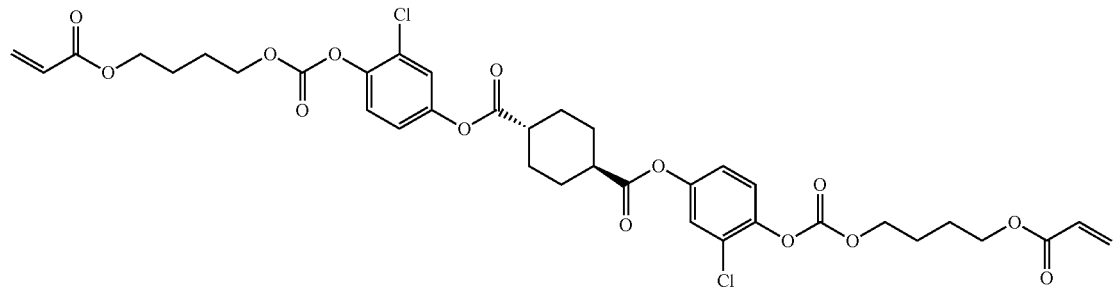

-continued

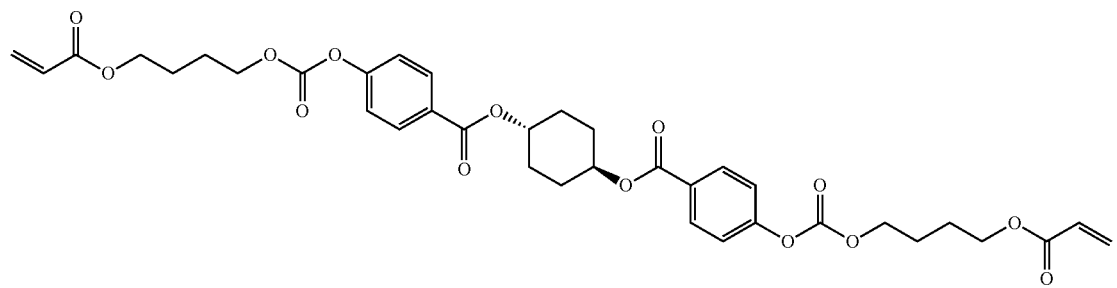

1-19

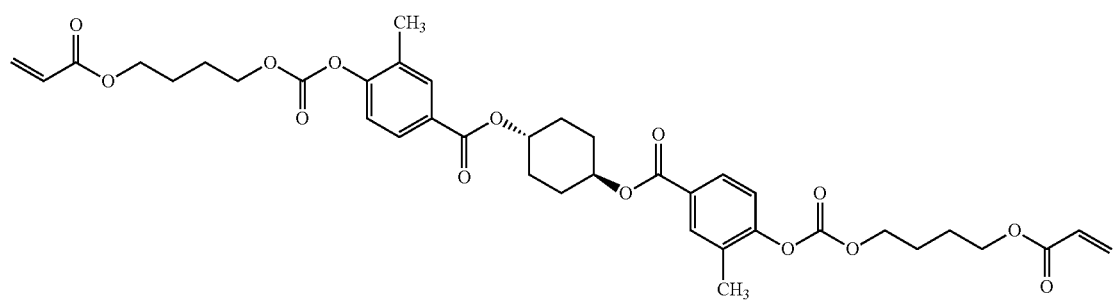

1-20

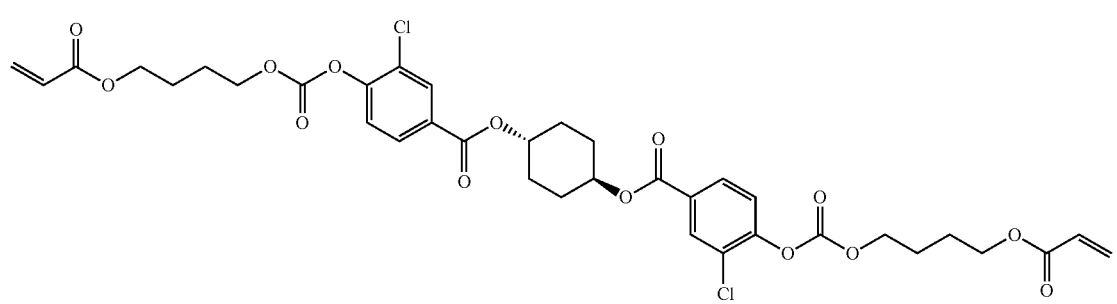

1-21

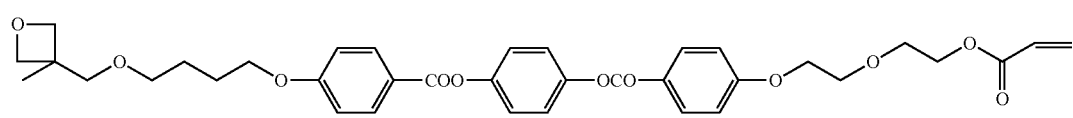

1-22

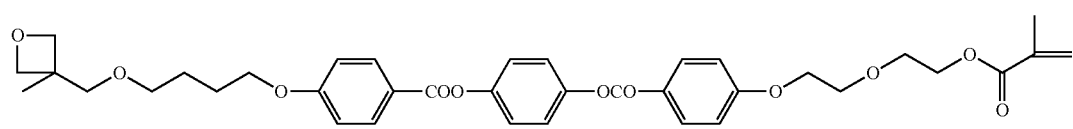

1-23

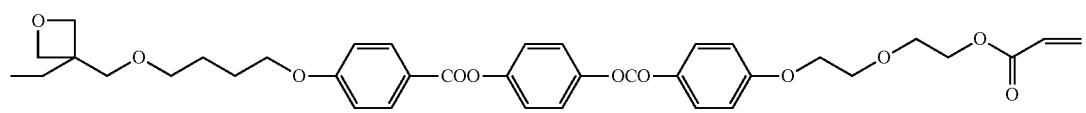

1-24

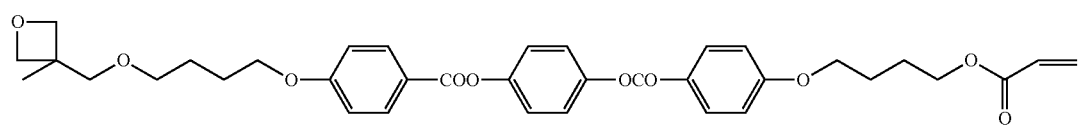

1-25

In another aspect of the present invention, a discotic liquid crystal is used in the optically anisotropic layer. The optically anisotropic layer is preferably a layer of a low-molecular-weight liquid-crystalline discotic compound such as monomer or a layer of a polymer obtained by polymerization (curing) of a polymerizable liquid-crystalline discotic compound. Illustrative examples of the discotic (disk-like) compounds can include benzene derivatives disclosed in a study report of C. Destrade et al., Mol. Cryst., vol. 71, page 111 (1981); truxene derivatives disclosed in a study report of C. Destrade et al., Mol. Cryst., vol. 122, page 141 (1985), and Phyics. Lett., A, vol. 78, page 82 (1990); cyclohexane derivatives disclosed in a study report of B. Kohne et al., Angew. Chem. vol. 96, page 70 (1984); and azacrown series and phenylacetylene series macrocycles disclosed in a study report of J. M. Lehn et al., J. Chem. Commun. page 1794 (1985), and a study report of J. Zhang et al., J. Am. Chem. Soc. vol. 116, page 2655 (1994). The above mentioned discotic (disk-like) compounds generally have a discotic core in the central portion and groups (L), such as linear alkyl or alkoxy groups or substituted benzoyloxy groups, which are substituted radially from the core. Among them, there are compounds exhibiting liquid crystallinity, and such compounds are generally called as discotic liquid crystal. However, such molecular assembly in uniform orientation shows negative uniaxiality, although it is not limited to the description. In the specification, the term of "formed of a discotic compound" is used to mean not only when finally comprising the discotic compound as a low-molecular weight compound, but also when finally comprising a high-molecular weight discotic compound, no longer exhibiting liquid crystallinity, formed by carrying out polymerizing or crosslinking reaction of the low-molecular weight discotic compound having at least one reactive group capable of thermal reaction or photo reaction under heating or under irradiation of light.

In the present invention, it is preferred to use the discotic liquid-crystalline compound represented by formula (III).

D(-L-P)$_n$   Formula (III)

In formula (III), D represents a disc core; L represents a divalent linking group; P is a polymerizable group; and n represents an integer of 4 to 12. The groups (-L-P) may be the same with or different from each other.

Preferable examples of the disc core (D), the divalent linking group (L) and the polymerizable group (P) in formula (III) are (D1) to (D15), (L1) to (L25), and (P1) to (P18), respectively, described in JP-A-2001-4837; and the contents of the patent publication are preferably employed in the present invention.

Preferable examples of the discotic compound are shown below.

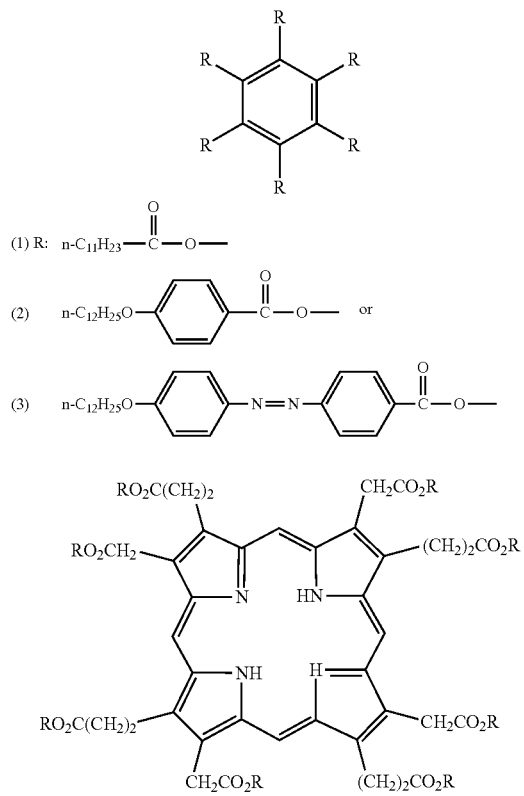

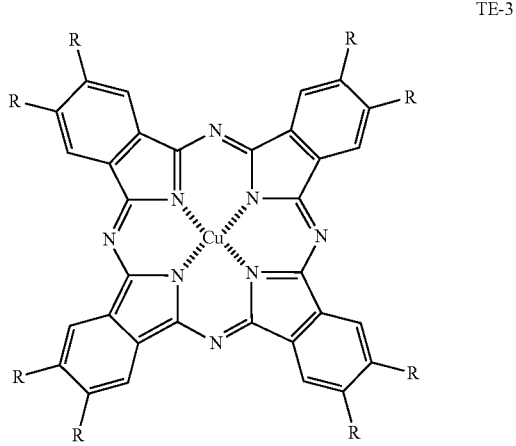

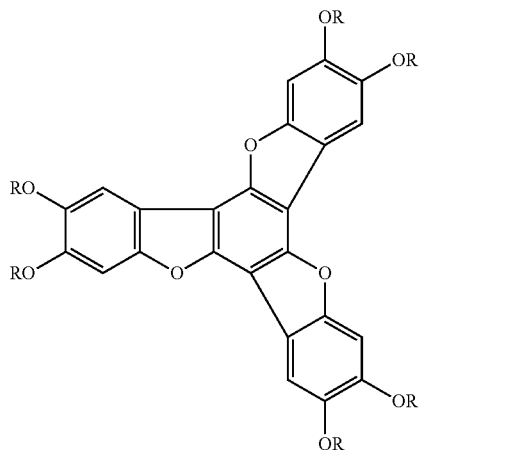

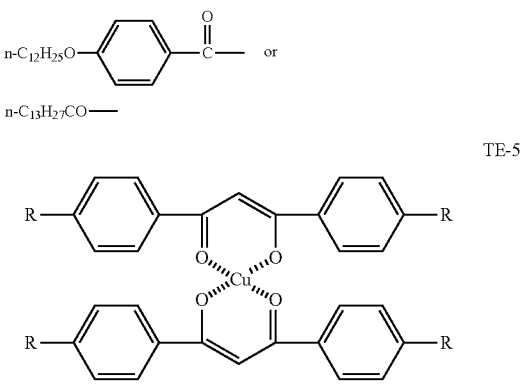

R: n-C₁₀H₂₁—
TE-6
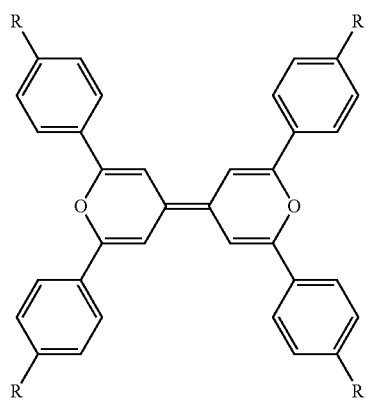
R: n-C₈H₁₇—
TE-7
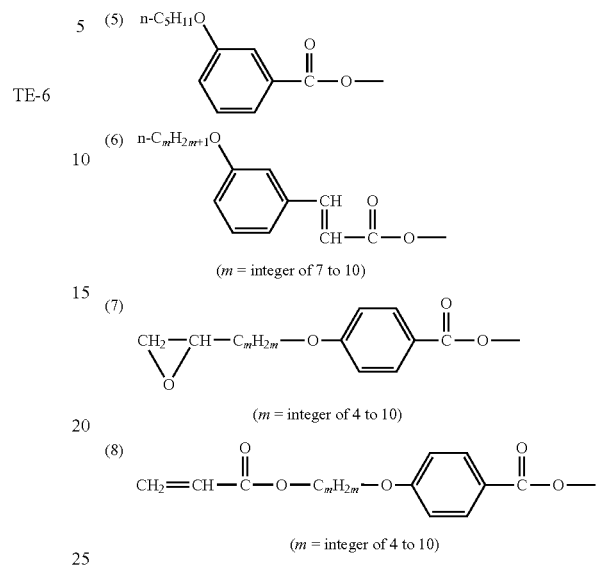
(5) n-C₅H₁₁O—⟨benzoate⟩—
(6) n-C_mH_{2m+1}O—⟨cinnamate⟩—
(m = integer of 7 to 10)
(7) glycidyl—O—C_mH_{2m}—O—⟨benzoate⟩—
(m = integer of 4 to 10)
(8) CH₂=CH—C(O)—O—C_mH_{2m}—O—⟨benzoate⟩—
(m = integer of 4 to 10)
TE-9
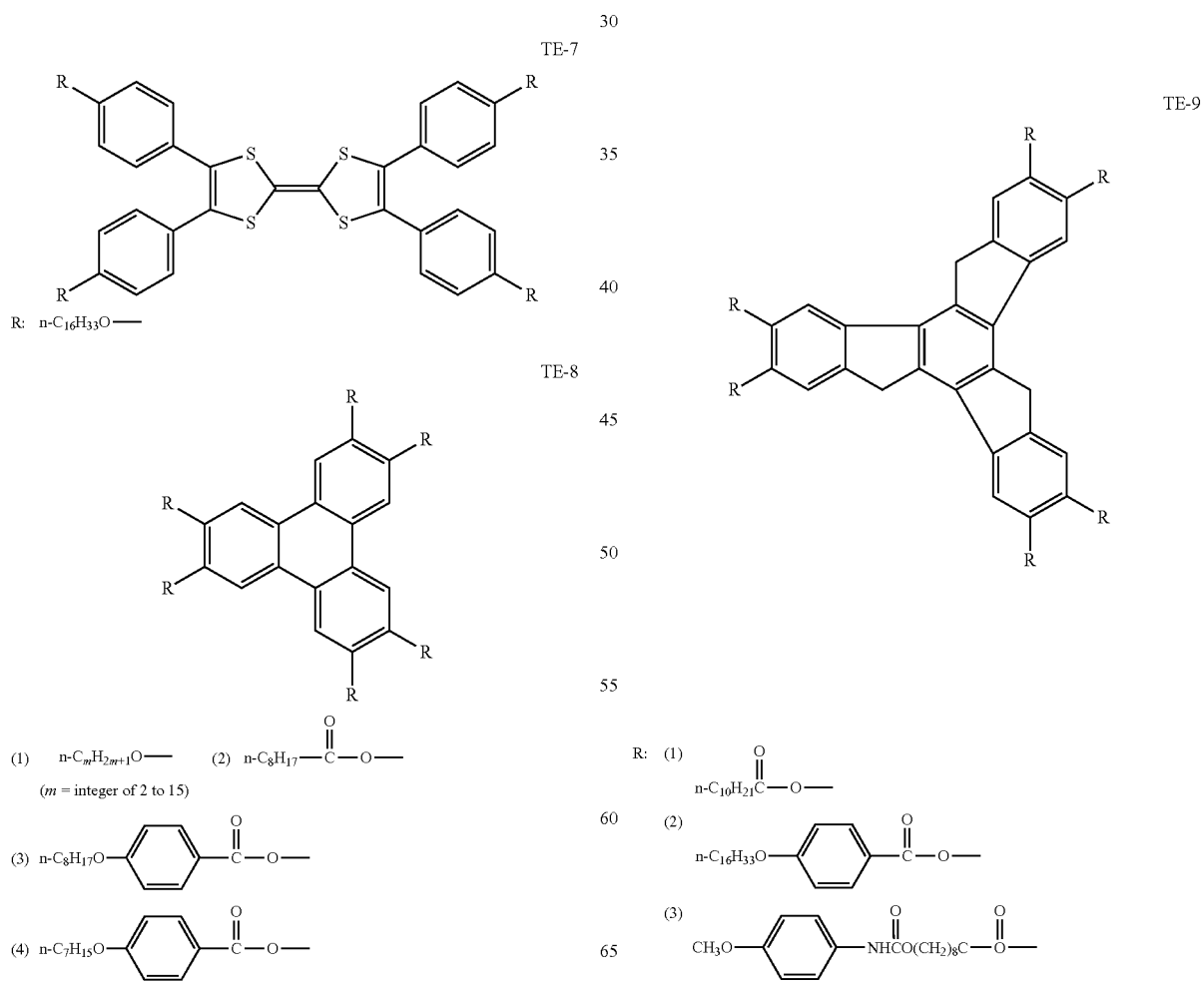
R: n-C₁₆H₃₃O—
TE-8
(1) n-C_mH_{2m+1}O—  (m = integer of 2 to 15)
(2) n-C₈H₁₇—C(O)—O—
(3) n-C₈H₁₇O—⟨benzoate⟩—
(4) n-C₇H₁₅O—⟨benzoate⟩—
R: (1) n-C₁₀H₂₁C(O)—O—
(2) n-C₁₆H₃₃O—⟨benzoate⟩—
(3) CH₃O—⟨phenyl⟩—NHCO(CH₂)₈C(O)—O—

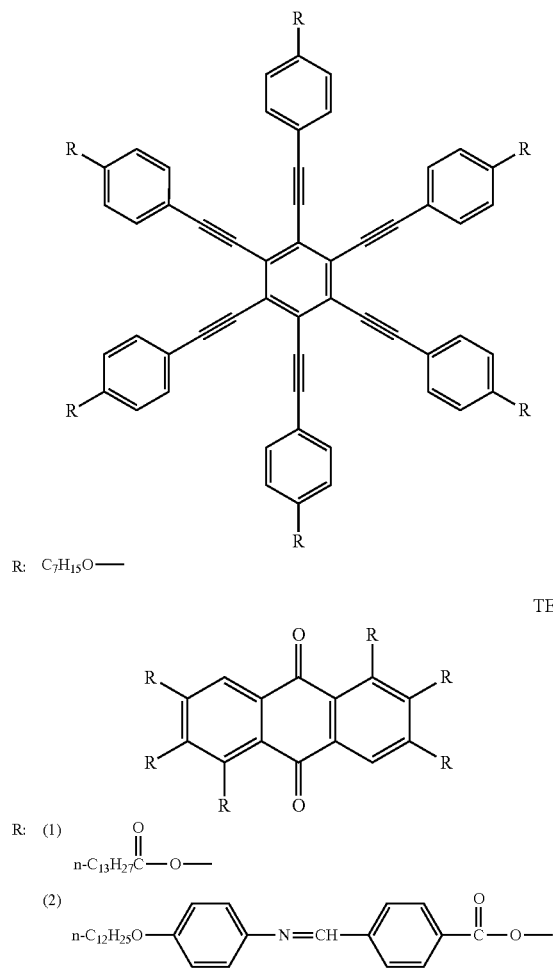

The optically anisotropic layer is preferably formed according to a method comprising applying a composition containing liquid crystalline compound (e.g., a coating liquid) to a surface of an alignment layer, described in detail later, aligning liquid crystalline molecules as to make an aligned state exhibiting a desired crystalline phase, and fixing the aligned state under heating or light-irradiating.

When a discotic liquid crystalline compound having reactive groups is used as the liquid crystalline compound, the discotic molecules in the layer may be fixed in any alignment state such as a horizontal alignment state, vertical alignment state, tilted alignment state, and twisted alignment state. In the specification, the term "horizontal alignment" means that, regarding rod-like liquid-crystalline molecules, the molecular long axes thereof and the horizontal plane of a support are parallel to each other, and, regarding discotic liquid-crystalline molecules, the disk-planes of the cores thereof and the horizontal plane of a support are parallel to each other. However, they are not required to be exactly parallel to each other, and, in the specification, the term "horizontal alignment" should be understood as an alignment state in which molecules are aligned with a tilt angle against a horizontal plane less than 10°. The tilt angle is preferably from 0° to 5°, more preferably 0° to 3°, much more preferably from 0° to 2°, and most preferably from 0° to 1°.

When two or more optically anisotropic layers formed of the compositions containing liquid-crystalline compounds are stacked, the combination of the liquid-crystalline compounds is not particularly limited, and the combination may be a stack formed of layers all comprising discotic liquid-crystalline compounds, a stack formed of layers all comprising rod-like liquid-crystalline compounds, or a stack formed of a layer comprising discotic liquid-crystalline compounds and a layer comprising rod-like liquid-crystalline compounds. Combination of orientation state of the individual layers also is not particularly limited, allowing stacking of the optically anisotropic layers having the same orientation states, or stacking of the optically anisotropic layer having different orientation states.

The optically-anisotropic layer is preferably formed by applying a coating solution, which contains at least one liquid-crystalline compound, the following polymerization initiator and other additives, on a surface of an alignment layer described below. Organic solvents are preferably used as a solvent for preparing the coating solution, and examples thereof include amides (e.g., N,N-dimethylformamide), sulfoxides (e.g., dimethylsulfoxide), heterocyclic compounds (e.g., pyridine), hydrocarbons (e.g., benzene, hexane), alkyl halides (e.g., chloroform, dichloromethane), esters (e.g., methyl acetate, butyl acetate), ketones (e.g., acetone, methylethylketone), and ethers (e.g., tetrahydrofuran, 1,2-dimethoxyethane). In particular, alkyl halides and ketones are preferable. Two or more kinds of organic solvents may be used in combination.

(Fixing of Liquid-Crystalline Compounds in an Alignment State)

It is preferred that the liquid-crystalline compounds in an alignment state are fixed without disordering the state. Fixing is preferably carried out by the polymerization reaction of the reactive groups contained in the liquid-crystalline compounds. The polymerization reaction includes thermal polymerization reaction using a thermal polymerization initiator and photo-polymerization reaction using a photo-polymerization initiator. Photo-polymerization reaction is preferred. Photo-polymerization reaction may be radical or cationic polymerization. Examples of the radical photo-polymerization initiators include α-carbonyl compounds (described in U.S. Pat. Nos. 2,367,661 and 2,367,670), acyloin ethers (described in U.S. Pat. No. 2,448,828), α-hydrocarbon-substituted aromatic acyloin compounds (described in U.S. Pat. No. 2,722,512), polynuclear quinone compounds (described in U.S. Pat. Nos. 3,046,127 and 2,951,758), combinations of a triarylimidazole dimer with p-aminophenyl ketone (described in U.S. Pat. No. 3,549,367), acridine and phenazine compounds (described in JP-A-60-105667 and U.S. Pat. No. 4,239,850), and oxadiazol compounds (described in U.S. Pat. No. 4,212,970). As the cationic-polymerization initiator, examples include organic sulfonium salts, iodonium salts, and phosphonium salts. The organic sulfonium salts are preferred, and triphenyl sulfonium salts are particularly preferred. As a counter ion of these compounds, hexafluoroantimonate, hexafluorophosphate, or the like is preferably used.

It is preferable to use the photopolymerization initiator in an amount of 0.01 to 20 mass %, more preferably 0.5 to 5 mass %, based on the solid content in the coating solution. In the photoirradiation for polymerizing the liquid crystalline compounds, it is preferable to use ultraviolet ray. The irradiation energy is preferably from 10 mJ/cm$^2$ to 10 J/cm$^2$, more preferably from 25 to 800 mJ/cm$^2$. Illuminance is preferably 10 to 1,000 mW/cm$^2$, more preferably 20 to 500 mW/cm$^2$, and further preferably 40 to 350 mW/cm$^2$. The irradiation wavelength is preferably 250 to 450 nm, and more preferably 300 to 410 nm at the peak. Irradiation may be carried out in an atmosphere of inert gas such as nitrogen gas and/or under heating to facilitate the photo-polymerization reaction.

(Orientation Induced by Irradiation of Polarized Light (Photoinduced Orientation))

The optically anisotropic layer may exhibit or enhance in-plane retardation attributed to photoinduced orientation with the aid of polarized light irradiation. The polarized light irradiation may be carried out in photo-polymerization process in the fixation of orientation, or the polarized light irradiation may precede and then may be followed by non-polarized light irradiation for further fixation, or the non-polarized light irradiation for fixation may precede and the polarized light irradiation may succeed for the photoinduced orientation. It is preferred that only the polarized light irradiation is conducted or the polarized light irradiation precedes and is followed by non-polarized light irradiation for further fixation. When the polarized light irradiation is carried out in photo-polymerization process in the fixation of orientation and a radical photo-polymerization initiator is used as the photo-polymerization initiator, the polarized light irradiation is preferably carried out under an inert gas atmosphere having an oxygen concentration of 0.5% or below. The irradiation energy is preferably 20 mJ/cm$^2$ to 10 J/cm$^2$, and more preferably 100 mJ/cm$^2$ to 800 mJ/cm$^2$. The illuminance is preferably 20 to 1000 mW/cm$^2$, more preferably 50 to 500 mW/cm$^2$, and still more preferably 100 to 350 mW/cm$^2$. Types of the liquid-crystalline compound to be cured by the polarized light irradiation are not particularly limited, wherein the liquid-crystalline compound having an ethylenically unsaturated group as the reactive group is preferable. It is preferred that the irradiation light to be used has a peak falling within the range from 300 to 450 nm, more preferred from 350 to 400 nm.

(Post-Curing with UV-Light Irradiation after Irradiation of Polarized Light)

After the first irradiation of polarized light for photoinduced orientation, the optically anisotropic layer may be irradiated with polarized or non-polarized ultraviolet light so as to improve the reaction rate (post-curing step). As a result, the adhesiveness is improved and, thus, the optically anisotropic layer can be produced with larger feeding speed. The post-curing step may be carried out with polarized or non-polarized light, and preferably with polarized light. Two or more steps of post-curing are preferably carried out with only polarized light, with only non-polarized light or with combination of polarizing and non-polarized light. When polarized and non-polarized light are combined, irradiating with polarized light previous to irradiating with non-polarized light is preferred. The irradiation of UV light may be or may not be carried out under an inert gas atmosphere. However, when a radical photo-polymerization initiator is used as the photo-polymerization initiator, the irradiation may be carried out preferably under an inert gas atmosphere where the oxygen gas concentration is 0.5% or lower. The irradiation energy is preferably 20 mJ/cm$^2$ to 10 J/cm$^2$, and more preferably 100 to 800 mJ/cm$^2$. The illuminance is preferably 20 to 1,000 mW/cm$^2$, more preferably 50 to 500 mW/cm$^2$, and still more preferably 100 to 350 mW/cm$^2$. As the irradiation wavelength, the irradiation of polarized light has a peak falling within the range preferably from 300 to 450 nm, more preferably from 350 to 400 nm. The irradiation of non-polarized light has a peak falling within the range preferably from 200 to 450 nm, more preferably from 250 to 400 nm.

(Fixing the Alignment State of Liquid-Crystalline Compounds Having Radically Reactive Group and Cationically Reactive Group)

As described above, it is also preferred that liquid-crystalline compound has two or more kinds of reactive groups which have different polymerization condition to each other. In such case, an optically anisotropic layer comprising polymer having unreacted reactive group can be produced by polymerizing only one type of reactive groups among plural types of reactive groups by selecting polymerization condition. The conditions which are suitable for the polymerization and fixation of the liquid-crystalline compounds having radically reactive group and cationically reactive group (the aforementioned I-22 to I-25 as specific examples) are explained below.

First, as the polymerization initiator, only a photopolymerization initiator which acts on a reactive group intended to be polymerized is preferred to be used. That is, it is preferred that, only radical photopolymerization initiator is used when radically reactive groups are selectively polymerized, and only cationic photopolymerization initiator is used when cationically reactive groups are selectively polymerized. The content of the photopolymerization initiator falls in the range preferably from 0.01 to 20% by mass, more preferably from 0.1 to 8% by mass, and further preferably from 0.5 to 4% by mass of the total solid content in the coating solution.

Second, light irradiation for the polymerization is preferably conducted by using ultra violet ray. When the irradiation energy and/or illuminance are too high, non-selective reaction of both of the radically reactive group and cationically reactive group is of concern. In view of the above, the irradiation energy is preferably 5 mJ/cm$^2$ to 500 mJ/cm$^2$, more preferably 10 to 400 mJ/cm$^2$, and particularly preferably 20 to 200 mJ/cm$^2$. The illuminance is preferably 5 to 500 mW/cm$^2$, more preferably 10 to 300 mW/cm$^2$, and particularly preferably 20 to 100 mW/cm$^2$. As the irradiation wavelength, the light has a peak falling within the range preferably from 250 to 450 nm, more preferably from 300 to 410 nm.

Among photopolymerization reaction, the reaction by using a radical photopolymerization initiator is inhibited by oxygen, and the reaction by using a cationic photopolymerization initiator is not inhibited by oxygen. Therefore, when one of the reactive groups of the liquid-crystalline compounds having radically reactive group and cationically reactive group is selectively reacted, it is preferred that the light irradiation is carried out in an atmosphere of inert gas such as nitrogen gas when the radically reactive group is selectively reacted, and in an atmosphere containing oxygen (for example, in air atmosphere) when the cationically reactive group is selectively reacted.

(Horizontal Orientation Agent)

At least one compound selected from the group consisting of the compounds represented by formula (1), (2) or (3), and fluorine-containing homopolymer or copolymer using the monomer represented by formula (4), which are shown below, may be added to the composition used for forming the optically anisotropic layer, in order to align the molecules of the liquid-crystalline compounds substantially horizontally.

The formulae (1) to (4) will be described in detail below.

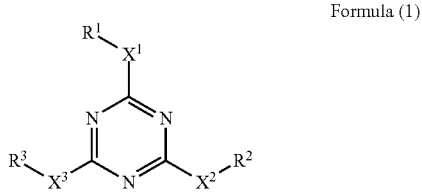

Formula (1)

In formula (1), $R^1$, $R^2$ and $R^3$ each independently represent a hydrogen atom or a substituent; and $X^1$, $X^2$ and $X^3$ each independently represent a single bond or a divalent linking group. As the substituent represented by $R^1$, $R^2$ and $R^3$, preferred is a substituted or unsubstituted alkyl group (preferably an unsubstituted alkyl group or a fluorine-substituted alkyl group), a substituted or unsubstituted aryl group (preferably an aryl group having a fluorine-substituted alkyl group), a substituted or unsubstituted amino group, a substituted or unsubstituted alkoxy group, a substituted or unsubstituted alkylthio group or a halogen atom. In formula (1), the divalent linking group represented by $X^1$, $X^2$ and $X^3$ is preferably selected from the group consisting of an alkylene group, an alkenylene group, a divalent aromatic group, a divalent heterocyclic group, —CO—, —$NR^a$— (in which $R^a$ represents an alkyl group having 1 to 5 carbon atoms, or a hydrogen atom), —O—, —S—, —SO—, —$SO_2$—, and a group made by any combination of two or more kinds thereof; and more preferably a divalent linking group selected from the group consisting of an alkylene group, a phenylene group, —CO—, —$NR^a$—, —O—, —S—, and —$SO_2$—, and a group made by any combination of at least two kinds thereof. The alkylene group preferably has 1 to 12 carbon atoms. The alkenylene group preferably has 2 to 12 carbon atoms. The divalent aromatic group preferably has 6 to 10 carbon atoms.

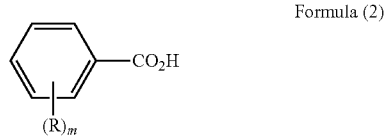

Formula (2)

In formula (2), R represents a substituent, and m represents an integer of 0 to 5. When m is 2 or more, plural R's may be the same or different to each other. Preferable examples of the substituent represented by R are the same as the examples listed above for each of $R^1$, $R^2$ and $R^3$. m is preferably an integer of 1 to 3, more preferably 2 or 3.

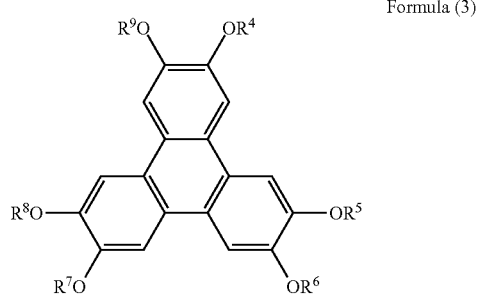

Formula (3)

In formula (3), $R^4$, $R^5$, $R^6$, $R^7$, $R^8$ and $R^9$ each independently represent a hydrogen atom or a substituent. Preferable examples of the substituent represented by each of $R^4$, $R^5$, $R^6$, $R^7$, $R^8$ and $R^9$ are the same as the examples listed above for each of $R^1$, $R^2$ and $R^3$ in formula (1). Examples of the horizontal orientation agent, which can be used in the present invention, include those described in paragraphs (0092) to (0096) in JP-A-2005-099248 and the methods for preparing such compounds are described in the document.

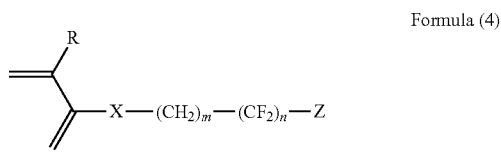

Formula (4)

In formula (4), R represents a hydrogen atom or a methyl group, X represents an oxygen atom or a sulfur atom, Z represents a hydrogen atom or a fluorine atom; m represents an integer of 1 to 6, and n represents an integer of 1 to 12.

In addition to the fluorine-containing polymer prepared by using the monomer represented by formula (4), the polymer compounds described in JP-A-2005-206638 and JP-A-2006-91205 can be used as horizontal orientation agents for reducing unevenness in coating. The methods of preparation of the compounds are also described in the publications.

The amount of the horizontal orientation agents added is preferably 0.01 to 20% by mass, more preferably 0.01 to 10% by mass, and most preferably 0.02 to 1% by mass with respect to the mass of the liquid crystalline compound. The compounds represented by any of the aforementioned formulae (1) to (4) may be used singly, or two or more types of them may be used in combination.

(Optically Anisotropic Layer Produced by Stretching)

The optically anisotropic layer may be produced by stretching polymer. When a polymer in the optically anisotropic layer, which is preferred to have at least one unreacted reactive group as described above, is produced, a polymer having a reactive group may be stretched or a reactive group may be introduced by using a coupling agent or the like to an optically anisotropic layer prepared by stretching. The characteristics of the optically anisotropic layer obtained by stretching include low cost, self-supporting property (a support is not needed when the layer is formed or maintained), and the like.

(Post-Treatment of Optically Anisotropic Layer)

Various post-treatments may be conducted to modify the optically anisotropic layer produced. Examples of the post treatments include corona treatment for improving adhesiveness, addition of a plasticizer for improving plasticity, addition of a heat polymerization inhibitor for improving storage stability, and coupling treatment for improving reactivity. When the polymer in the optically anisotropic layer have an unreacted reactive group, addition of a polymerization initiator suited to the reactive group may also be a useful modification method. For example, by addition of a radical photopolymerization initiator to an optically anisotropic layer fixed by polymerization of a liquid crystalline compound having a cationically reactive group and a radically reactive group by using a cationic photopolymerization initiator, the reaction of the unreacted radically reactive group in the patterning afterward can be promoted. As the method of addition of the plasticizer or the photopolymerization initiator, examples include immersing the optically anisotropic layer in a solution of the desired additive, and applying a solution of the desired additive to the optically anisotropic layer for the permeance of the solution. Further, when another layer is applied to the optically anisotropic layer, the desired additive may be added to the coating solution of the layer for permeance to the optically anisotropic layer.

(Birefringent Pattern Builder)

The birefringent pattern builder is a material for producing a birefringence pattern, and a material from which birefringence pattern can be obtained by proceeding predetermined steps. The birefringent pattern builder may generally be in a shape of film or sheet. The birefringent pattern builder may include a functional layer which can be applied with various accessory functions, other than the optically anisotropic layer. Examples of the functional layer include a support, an alignment layer, a reflective layer, and a post-adhesive layer. Further, the birefringent pattern builder used as a transferring material or the birefringent pattern builder produced by using a transferring material may include a temporary support, an adhesive layer for transfer, or a dynamic property control layer.

(Support)

The birefringent pattern builder may include a support for the purpose of maintaining the dynamic stability. The support used for the birefringent pattern builder is not particularly limited, and it may be rigid or flexible, and it may be transparent. As a rigid support, examples include, although not particularly limited to, known glasses such as soda glass sheet having a silicon oxide film formed on the surface thereof, low-expansion glass, non-alkali glass, and silica glass sheet; metal plates such as aluminum plate, iron plate, and SUS plate; resin plate, ceramic plate, and stone plate. As a flexible support, examples include, although not particularly limited to, plastic films such as cellulose ester (for example, cellulose acetate, cellulose propionate, and cellulose butyrate), polyolefin (for example, norbornene based polymer), poly(meth) acrylate (for example, polymethylmethacrylate), polycarbonate, polyester, and polysulfone; paper, aluminium foil, and fabric. In view of the convenience of handling, the thickness of the rigid support is preferably 100 to 3,000 µm, and more preferably 300 to 1,500 µm. The thickness of the flexible support is preferably 3 to 500 µm, and more preferably 10 to 200 µm. The support is preferred to have heat-resistance sufficient for preventing coloring or deformation in the after-mentioned baking step. The support is also preferred to have reflective function itself instead of provided with the after-mentioned reflective layer separately.

(Alignment Layer)

As described above, an alignment layer may be used for forming the optically anisotropic layer. The alignment layer may be generally formed on the surface of a support or a temporary support, or on the surface of an undercoating layer formed on the support. The alignment layer has function of controlling the alignment of liquid crystalline compounds thereon, and, as far as having such function, may be selected from various known alignment layers. The alignment layer that can be employed in the present invention may be provided by rubbing a layer formed of an organic compound (preferably a polymer), oblique vapor deposition of in organic compound, formation of a layer with microgrooves, or the deposition of organic compounds (for example, omega-tricosanoic acid, dioctadecylmethylammonium chloride, and methyl stearate) by the Langmuir-Blodgett (LB) film method. Further, alignment layers imparted with orientation functions by exposure to an electric or magnetic field or irradiation with light are also exemplified.

Examples of the organic compound, which can be used for forming the alignment layer, include polymers such as poly-methyl methacrylate, acrylic acid/methacrylic acid copolymer, styrene/maleimide copolymer, polyvinyl alcohol, poly (N-methyrol acrylamide), polyvinylpyrrolidone, styrene/vinyl toluene copolymer, chlorosulfonated polyethylene, nitrocellulose, polyvinyl chloride, chlorinated polyolefin, polyester, polyimide, vinyl acetate/vinyl chloride copolymer, ethylene/vinyl acetate copolymer, carboxymethyl cellulose, polyethylene, polypropylene and polycarbonates; and silane coupling agents. Preferred examples of the polymer include polyimide, polystyrene, styrene based polymers, gelatin, polyvinyl alcohol and alkyl-modified polyvinyl alcohol having at least one alkyl group (preferably an alkyl group having carbon atoms of 6 or more).

For production of an alignment layer, a polymer may preferably used. The types of the polymer, which is used for forming the alignment layer, may be decided depending on what types of alignment of liquid crystalline compound (in particular, the average tilt angle) is preferred. For forming an alignment layer capable of aligning liquid crystalline compounds horizontally, a polymer which does not lower the surface energy of the alignment layer (a usual polymer for forming alignment layer) is used. Specifically, kinds of such a polymer are described in various documents concerning liquid crystal cells or optical compensation sheets. Polyvinyl alcohols, modified polyvinyl alcohols, copolymers with polyacrylic acid or polyacrylate; polyvinyl pyrrolidone, cellulose and modified cellulose are preferably used. Materials used for producing the alignment layer may have a functional group capable of reacting with the reactive group of the liquid crystalline compound in the optically anisotropic layer. Examples of the polymer having such a functional group include polymers having side chains comprising a repeating unit having such a functional group, and polymers having a cyclic moiety substituted with such a functional group. It is more preferable to use an alignment layer capable of forming a chemical bond with the liquid-crystalline compound at the interface, and a particularly preferable example of such alignment layer is a modified polyvinyl alcohol, described in JP-A-9-152509, which has an acrylic group introduced in the side chain thereof using acid chloride or Karenz MOI (trade name, manufactured by Showa Denko K. K.). The thickness of the alignment layer is preferably 0.01 to 5 µm, and more preferably 0.05 to 2 µm. The alignment layer may function as an oxygen insulation layer.

Polyimide film which has been widely used as an alignment layer for LCD (preferably a layer composed of a fluorine-atom-containing polyimide) is also preferable. The film may be formed by applying poly(amic acid), provided, for example, as LQ/LX series products by Hitachi Chemical Co., Ltd or as SE series products by NISSAN CHEMICAL INDUSTRIES, LTD, to a surface of the support, heating at 100 to 300° C. for 0.5 to one hour to form a polymer layer, and rubbing a surface of the polymer layer.

The rubbing treatment may be carried out with known techniques which have been employed in the usual step for aligning of LCD. In particular, the rubbing treatment may be carried out by rubbing a surface of a polymer layer in a direction, with paper, gauze, felt, rubber, nylon or polyester fiber or the like. The rubbing treatment is generally carried out, for example, by rubbing a surface of a polymer layer in a direction for several times with a cloth having the same length and the same diameter fibers grafted uniformly.

Examples of a deposition material used in inorganic oblique vapor deposition film include metal oxides such as $SiO_2$, which is a typical material, $TiO_2$ and $ZnO$; fluorides such as $MgF_2$; metals such as Au and Al. Any high dielectric constant metal oxides can be used in oblique vapor deposition, and, thus, the examples thereof are not limited to the above mentioned materials. The inorganic oblique deposition film may be produced with a deposition apparatus. The deposition film may be formed on an immobile polymer film (a support) or on a long film fed continuously.

(Reflective Layer)

The birefringent pattern builder may have a reflective layer for the purpose of producing more readily identifiable birefringence pattern. As the reflective layer, examples include, but not to be limited to, metal layer such as aluminum or silver.

(Post-Adhesive Layer)

The birefringent pattern builder may have a post-adhesive layer in order that the patterned birefringent product produced after the after-mentioned patterning and baking can be attached to another product. The material of the post-adhesive layer is not particularly limited, but preferred to be a material which has adhesiveness even after the baking step for production of the birefringence pattern.

(Two or More Optically Anisotropic Layer)

The birefringent pattern builder may have two or more optically anisotropic layers. The two or more optically anisotropic layers may be adjacent to each other in direction of the normal line, or may sandwich another functional layer. The two or more optically anisotropic layers may have almost the same retardation to each other, or different retardation to each other. The slow axes of them may be in the same direction to each other, or different direction to each other.

As an example wherein a birefringent pattern builder having two or more optically anisotropic layers laminated so that the slow axis of each is in the same direction is used, a case of preparing a pattern having large retardation can be mentioned. Even when the optically anisotropic layer at hand singly has insufficient retardation, a patterned optically anisotropic layer including a region having large retardation can be readily obtained by laminating two or three layers and then conducting patterning.

(Method of Producing Birefringent Pattern Builder)

The method of producing the birefringent pattern builder is not particularly limited. For example, the birefringent pattern builder may be produced by: directly forming an optically anisotropic layer on a support; transferring an optically anisotropic layer on a support by using another birefringent pattern builder used as a transferring material; forming a self-supporting optically anisotropic layer; forming another functional layer on a self-supporting optically anisotropic layer; or attaching a support to a self-supporting optically anisotropic layer; or the like. Among these, in view of avoiding limitation to the property of the optically anisotropic layer, a method of direct formation of an optically anisotropic layer on a support and a method of transfer of an optically anisotropic layer on a support by using transferring material are preferred. Further, in view of avoiding limitation to the support, a method of transfer of an optically anisotropic layer on a support by using transferring material is more preferred.

As the method for producing the birefringent pattern builder having two or more optically anisotropic layers, the birefringent pattern builder may be produced by, for example, directly forming an optically anisotropic layer on a different birefringent pattern builder; transferring an optically anisotropic layer on a birefringent pattern builder by using a different birefringent pattern builder as a transferring material. Among these, transfer of an optically anisotropic layer on a birefringent pattern builder by using another birefringent pattern builder as a transferring material is more preferable.

A birefringent pattern builder used as a transferring material will be explained in the followings. A birefringent pattern builder used as a transferring material may be referred to as "transferring material for producing birefringence pattern" in the specification especially in the after-mentioned Examples.

(Temporary Support)

The birefringent pattern builder used as a transferring material is preferred to have a temporary support. The temporary support is not particularly limited and may be transparent or opaque. Examples of the polymer, which can constitute a temporary support, include cellulose ester (for example, cellulose acetate, cellulose propionate, and cellulose butyrate), polyolefin (for example, norbornene based polymer), poly(meth)acrylate (for example, polymethylmethacrylate), polycarbonate, polyester, and polysulfone. For the purpose of optical property examination in a manufacturing process, the support is preferably selected from transparent and low-birefringence polymer films. Examples of the low-birefringence polymer films include cellulose ester films and norbornene based polymer films. Commercially available polymers such as a norbornene based polymer, "ARTON" provided by JSR and "ZEONEX" and "ZEONOR" provided by ZEON CORPORATION may be used. Polycarbonate, poly(ethylene terephthalate), or the like which is inexpensive, may also be preferably used.

(Adhesive Layer for Transfer)

The transferring material is preferred to have an adhesive layer for transfer. The adhesive layer for transfer is not particularly limited as far as the layer is transparent and non-colored, and has sufficient property for transfer. Examples include adhesive layer using an adhesive agent, a pressure-sensitive resin layer, a heat-sensitive resin layer, and a photo-sensitive resin layer. Among these, the heat-sensitive resin layer and the photo-sensitive resin layer are preferred in view of heat-resistance (resistance to baking) required in the application to a substrate for liquid crystal display device.

The adhesive agent is preferred to exhibit, for example, good optical transparency, suitable wettability, and adhesive characteristics such as cohesiveness and adhesiveness. Specific examples are adhesive agents prepared using a suitable base polymer such as an acrylic polymer, silicone polymer, polyester, polyurethane, polyether, or synthetic rubber. The adhesive characteristics of the adhesive layer can be suitably controlled by conventionally known methods. These include adjusting the composition and/or molecular weight of the base polymer forming the adhesive layer, and adjusting the degree of crosslinking and/or the molecular weight thereof by means of the crosslinking method, the ratio of incorporation of crosslinking functional groups, and the crosslinking agent blending ratio.

The pressure-sensitive resin layer is not specifically limited as far as it exhibits adhesiveness when pressure is applied. Various adhesives, such as rubbers, acrylics, vinyl ethers, and silicones, can be employed as the pressure-sensitive adhesive. The adhesives may be employed in the manufacturing and coating stages in the form of solvent adhesives, non-water-based emulsion adhesives, water-based emulsion adhesives, water-soluble adhesives, hot melt adhesives, liquid hardening adhesives, delayed tack adhesives, and the like. Rubber adhesives are described in Shin Kobunshi Bunko 13 (the New Polymer Library 13), "Nènchaku Gijutu (Adhesion Techniques)," Kobunshi Kankokai (K. K.), p. 41 (1987). Examples of the vinyl ether adhesives include vinyl ether comprised mainly of alkyl vinyl ether compounds having 2 to 4 carbon atoms, and vinyl chloride/vinyl acetate copolymers, vinyl acetate polymers, polyvinyl butyrals, and the like, to which a plasticizer is admixed. With respect to the silicone adhesives, rubber siloxane can be used to impart film formation and condensation strength of the film, and resinous siloxane can be used to impart adhesiveness or tackiness.

The heat-sensitive resin layer is not specifically limited as far as it exhibits adhesiveness when heat is applied. Examples of the heat-sensitive adhesives include hot-melt compounds and thermoplastic resins. Examples of the hot-melt compounds include low molecular weight compounds in the form of thermoplastic resins such as polystyrene resin, acrylic resin, styrene-acrylic resin, polyester resin, and polyurethane resin; and various waxes in the form of vegetable waxes such as carnauba wax, Japan wax, candelilla wax, rice wax, and auricury wax; animal waxes such as beeswax, insect waxes, shellac, and whale wax; petroleum waxes such as paraffin wax, microcrystalline wax, polyethylene wax, Fischer-Tropshe wax, ester wax, and oxidized waxes; and mineral waxes such as montan wax, ozokerite, and ceresin wax. Further examples include rosin, hydrogenated rosin, polymerized rosin, rosin-modified glycerin, rosin-modified maleic acid resin, rosin-modified polyester resin, rosin-modified phenol resin, ester rubber, and other rosin derivatives; as well as phenol resin, terpene resin, ketone resin, cyclopentadiene resin, aromatic hydrocarbon resin, aliphatic hydrocarbon resin, and alicyclic hydrocarbon resin.

These hot-melt compounds preferably have a molecular weight of, usually 10,000 or less, particularly 5,000 or less, and a melting or softening point desirably falling within a range of 50° C. to 150° C. These hot-melt compounds may be used singly or in combinations of two or more. Examples of the above-mentioned thermoplastic resin include ethylene series copolymers, polyamide resins, polyester resins, polyurethane resins, polyolefin series resins, acrylic resins, and cellulose series resins. Among these, the ethylene series copolymers are preferably used.

The photosensitive resin layer may be formed of a photosensitive polymer composition, for which either of positive type and negative type is acceptable, and commercial resist material may also be used. When used as an adhesive layer for transfer, adhesiveness is preferably exhibited by light irradiation. For improvement of environmental safety and prevention of explosion in the production method, for example, for substrates for liquid crystal display devices, the photosensitive resin layer is preferably developed with an aqueous developing solution containing organic solvents in an amount of 5% or less, particularly preferably with an alkali developing solution. The photosensitive resin layer is preferably formed of a resin composition comprising at least (1) a polymer, (2) a monomer or oligomer, and (3) a photopolymerization initiator or photopolymerization initiator systems.

These components (1) to (3) will be explained below.
(1) Polymer

The polymer (hereinafter also simply referred to as "binder") is preferably an alkali-soluble resin comprising a polymer having a polar group such as a carboxylic acid group or a carboxylate group at its side chain. Examples of the resin include a methacrylic acid copolymer, an acrylic acid copolymer, an itaconic acid copolymer, a crotonic acid copolymer, a maleic acid copolymer, and a partially esterified maleic acid copolymer described in, for example, JP-A-59-44615, JP-B-54-34327 ("JP-B" means examined Japanese patent publication), JP-B-58-12577, JP-B-54-25957, JP-A-59-53836, and JP-A-59-71048. The examples further include a cellulose derivative having a carboxylic acid group at its side chain. In addition to the foregoing, a product obtained by adding a cyclic acid anhydride to a polymer having a hydroxyl group can also be preferably used. In addition, particularly preferable examples of the binder include a copolymer of benzyl (meth)acrylate and (meth)acrylic acid and a multicomponent copolymer of benzyl(meth)acrylate, (meth)acrylic acid, and any other monomer, described in U.S. Pat. No. 4,139,391. Each of these binder polymers each having a polar group may be used singly, or may be used in combination with an ordinary film formable polymer so that they are used in a state of a composition. The binder polymer is added in an amount of generally 20 to 70 parts by mass, preferably 25 to 65 parts by mass, and more preferably 25 to 45 parts by mass with respect to the total solid content.
(2) Monomer or Oligomer The monomer or oligomer contained in the photosensitive resin layer is preferably a monomer or oligomer which has two or more ethylenically unsaturated double bonds and which undergoes addition-polymerization by irradiation with light. Examples of such monomer or oligomer include a compound having at least one addition-polymerizable ethylenically unsaturated group in the molecule and having a boiling point of 100° C. or higher at normal pressure. Examples thereof include: a monofunctional acrylate and a monofunctional methacrylate such as polyethylene glycol mono(meth) acrylate, polypropylene glycol mono(meth)acrylate, and phenoxyethyl(meth)acrylate; polyethylene glycol di(meth) acrylate, polypropylene glycol di(meth)acrylate, trimethylolethane triacrylate, trimethylolpropane tri(meth)acrylate, trimethylolpropane diacrylate, neopentyl glycol di(meth) acrylate, pentaerythritol tetra(meth)acrylate, pentaerythritol tri(meth)acrylate, dipentaerythritol hexa(meth)acrylate, dipentaerythritol penta(meth)acrylate, hexanediol di(meth) acrylate, trimethylolpropane tri(acryloyloxypropyl)ether, tri (acryloyloxyethyl)isocyanurate, tri(acryloyloxyethyl)cyanurate, glycerin tri(meth)acrylate; a polyfunctional acrylate or polyfunctional methacrylate which may be obtained by adding ethylene oxide or propylene oxide to a polyfunctional alcohol such as trimethylolpropane or glycerin and converting the adduct into a (meth)acrylate.

Examples of the monomer and the oligomer further include urethane acrylates as described in JP-B-48-41708, JP-B-50-6034, and JP-A-51-37193; polyester acrylates as described in JP-A-48-64183, JP-B-49-43191, and JP-B-52-30490; and polyfunctional acrylates or polyfunctional methacrylates such as an epoxy acrylate which is a reaction product of an epoxy resin and (meth)acrylic acid.

Among these, trimethylolpropane tri(meth)acrylate, pentaerythritol tetra(meth)acrylate, dipentaerythritol hexa(meth) acrylate, and dipentaerythritol penta(meth)acrylate are preferable.

Further, other than the above, "polymerizable compound B" described in JP-A-11-133600 can be mentioned as a preferable example.

These monomers or oligomers may be used singly or as a mixture of two or more kinds thereof. The content of the monomer or the oligomer is generally in a range of 5 mass % to 50 mass %, preferably 10 mass % to 40 mass %, based on the total solid content in the photosensitive resin layer.
(3) Photopolymerization Initiator or Photopolymerization Initiator System Examples of the photopolymerization initiator or the photopolymerization initiator system (in the present specification, the term "photo-polymerization initiator system" means a polymerization initiating mixture that exhibits a function of photo-polymerization initiation with a plurality of compounds combined with each other) include vicinal polyketaldonyl compounds disclosed in U.S. Pat. No. 2,367,660, acyloin ether compounds described in U.S. Pat. No. 2,448, 828, aromatic acyloin compounds substituted by an α-hydrocarbon described in U.S. Pat. No. 2,722,512, polynuclear quinone compounds described in U.S. Pat. No. 3,046,127 and U.S. Pat. No. 2,951,758, combinations of triarylimidazole dimer and p-aminoketone described in U.S. Pat. No. 3,549,367, benzothiazole compounds and trihalomethyl-s-triazine compounds described in JP-B-51-48516, trihalomethyl-triazine compounds described in U.S. Pat. No. 4,239,850, and trihalomethyloxadiazole compounds described in U.S. Pat. No. 4,212,976. In particular, trihalomethyl-s-triazine, trihalomethyloxadiazole, and triarylimidazole dimer are preferable.

In addition, "polymerization initiator C" described in JP-A-11-133600 can also be mentioned as preferable examples.

These photopolymerization initiators and photopolymerization initiator systems each may be used singly. Alternatively, a mixture of two or more selected from these photopolymerizable initiators and photopolymerization initiator systems may be used. In particular, it is preferable to use two or more selected from photopolymerizable initiators and photopolymerization initiator systems. When two or more selected from photopolymerizable initiators and photopolymerization initiator systems are used, the display property, particularly evenness of display, can be improved.

As to the content of the photopolymerization initiator and the photopolymerization initiator systems, the content is generally in the range of 0.5 to 20 mass %, preferably 1 to 15 mass %, based on the total solid content in the photosensitive resin layer.

The photosensitive resin layer preferably contains an appropriate surfactant, from the viewpoint of effectively preventing non-uniformity. Any surfactants are applicable so far as they are miscible with the photosensitive resin composition. Surfactants preferably applicable to the present invention include those disclosed in paragraphs (0090) to (0091) in JP-A-2003-337424, paragraphs (0092) to (0093) in JP-A-2003-177522, paragraphs (0094) to (0095) in JP-A-2003-177523, paragraphs (0096) to (0097) in JP-A-2003-177521, paragraphs (0098) to (0099) in JP-A-2003-177519, paragraphs (0100) to (0101) in JP-A-2003-177520, paragraphs (0102) to (0103) in JP-A-11-133600 and those disclosed as the invention in JP-A-6-16684. In order to obtain higher effects, it is preferable to use any of fluorine-containing surfactants and/or silicon-base surfactants (fluorine-containing surfactant, or, silicon-base surfactant, and surfactant containing both of fluorine atom and silicon atom), or two or more surfactants selected therefrom, wherein the fluorine-containing surfactant is most preferable. When the fluorine-containing surfactant is used, the number of fluorine atoms contained in the fluorine-containing substituents in one surfactant molecule is preferably 1 to 38, more preferably 5 to 25, and most preferably 7 to 20. Too large number of fluorine atoms degrades the solubility in general fluorine-free solvents and thus is undesirable. Too small number of fluorine atoms does not provide effects of improving the non-uniformity and thus is undesirable.

Particularly preferable surfactants can be those containing a copolymer which includes the monomers represented by formula (a) or (b) below, with the ratio of mass of formula (a)/formula (b) of 20/80 to 60/40.

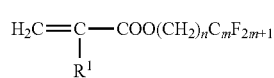

Formula (a)

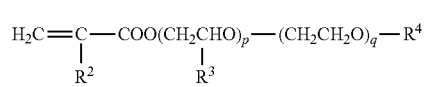

Formula (b)

In the formulae, $R^1$, $R^2$ and $R^3$ independently represent a hydrogen atom or a methyl group, $R^4$ represents a hydrogen atom or an alkyl group having 1 to 5 carbon atoms. n represents an integer of 1 to 18, and m represents an integer of 2 to 14. p and q represent integers from 0 to 18, excluding the case where both of p and q are 0.

It is to be defined now that a monomer represented by formula (a) and a monomer represented by formula (b) of the particularly preferable surfactants are denoted as monomer (a) and monomer (b), respectively. $C_mF_{2m+1}$ in formula (a) may be straight-chained or branched. m represents an integer of 2 to 14, and is preferably an integer of 4 to 12. Content of $C_mF_{2m+1}$ is preferably 20 to 70% by mass, and more preferably 40 to 60% by mass, of monomer (a). $R^1$ represents a hydrogen atom or a methyl group. n represents 1 to 18, and more preferably 2 to 10. $R^2$ and $R^3$ in formula (b) independently represent a hydrogen atom or a methyl group, and $R^4$ represents a hydrogen atom or an alkyl group having 1 to 5 carbon atoms. p and q respectively represent integers of 0 to 18, excluding the case where both of p and q are 0. p and q are preferably 2 to 8.

The monomer (a) contained in one particularly preferable surfactant molecule may be those having the same structure, or having structures differing within the above-defined range. The same also applies to the monomer (b).

The weight-average molecular weight Mw of a particularly preferable surfactant preferably falls in the range from 1,000 to 40,000, and more preferably from 5,000 to 20,000. The surfactant characteristically contains a copolymer composed of the monomers expressed by formula (a) and formula (b), and having the ratio of mass of monomer (a)/monomer (b) of 20/80 to 60/40. Hundred parts by weight of a particularly preferable surfactant is preferably composed of 20 to 60 parts by weight of monomer (a), 80 to 40 parts by weight of monomer (b), and residual parts by weight of other arbitrary monomers, and more preferably 25 to 60 parts by weight of monomer (a), 60 to 40 parts by weight of monomer (b), and residual parts by weight of other arbitrary monomer.

Copolymerizable monomers other than monomers (a) and (b) include styrene and derivatives or substituted compounds thereof including styrene, vinyltoluene, α-methylstyrene, 2-methylstyrene, chlorostyrene, vinylbenzoic acid, sodium vinylbenzene sulfonate, and aminostyrene; dienes such as butadiene and isoprene; and vinyl-base monomers such as acrylonitrile, vinylethers, methacrylic acid, acrylic acid, itaconic acid, crotonic acid, maleic acid, partially esterified maleic acid, styrene sulfonic acid, maleic anhydride, cinnamic acid, vinyl chloride and vinyl acetate.

A particularly preferable surfactant is a copolymer of monomer (a), monomer (b) and so forth, allowing monomer sequence of random or ordered, such as forming a block or graft, while being not specifically limited. A particularly preferable surfactant can use two or more monomers differing in the molecular structure and/or monomer composition in a mixed manner.

Content of the surfactant is preferably adjusted to 0.01 to 10% by mass to the total amount of solid content of the photosensitive resin layer, and more preferably to 0.1 to 7% by mass. The surfactant contains predetermined amounts of a surfactant of a specific structure, ethylene oxide group and polypropylene oxide group. Therefore, addition of the surfactant at an amount within a specific range to the photosensitive resin layer enables non-uniformity to reduce in the display on the liquid crystal display device provided with the photosensitive resin layer. When the content is too small to the total amount of solid components, the non-uniformity in the display is not reduced, and when the content is too large, the effect of reducing the non-uniformity in the display is saturated. Production of the color filter while adding the particularly preferable surfactant described in the above to the photosensitive resin layer is preferable in terms of improving the non-uniformity in the display.

Preferable specific examples of fluorine-containing surfactant include the compounds described in paragraphs (0054) to (0063) in JP-A-2004-163610. The commercial surfactants listed below may also be used directly. As applicable commercial surfactants, examples include fluorine-containing surfactants such as Eftop EF301, EF303 (products of Shin-Akita Kasei K. K.), Florade FC430, 431 (products of Sumitomo 3M Co., Ltd.), Megafac F171, F173, F176, F189, R08 (products of Dainippon Ink and Chemicals, Inc.), Surflon S-382, SC101, 102, 103, 104, 105, 106 (products of Asahi Glass Co., Ltd.), and silicon-base surfactants. Also polysiloxane polymer KP-341 (product of Shin-Etsu Chemical Co., Ltd.) and Troysol S-366 (product of Troy Chemical Industries, Inc.) may be used as the silicon-base surfactants. The compounds disclosed in paragraphs (0046) to (0052) in JP-A-2004-331812, which are fluorine-containing surfactants not containing the monomer represented by formula (a) also preferably used.

(Dynamic Property Control Layer)

Between the temporary support and the optically anisotropic layer of the transferring material, a dynamic property control layer to control mechanical characteristics and conformity to irregularity may be preferably provided. The dynamic property control layer preferably exhibit flexible elasticity, is softened by heat, or fluidize by heat. A thermoplastic resin layer is particularly preferred for the dynamic property control layer. The component used in the thermoplastic resin layer is preferably an organic polymer substance described in JP-A-5-72724. The substance can be preferably selected from organic polymer substances having a softening point of about 80° C. or lower according to the Vicat method (specifically, the method of measuring a polymer softening point according to American Material Test Method ASTMD 1235). More specifically, examples include: a polyolefin such as polyethylene or polypropylene; an ethylene copolymer such as a copolymer of ethylene and vinyl acetate or a saponified product thereof; a copolymer of ethylene and acrylic acid ester or a saponified product thereof; polyvinyl chloride; a vinyl chloride copolymer such as a copolymer of vinyl chloride and vinyl acetate or a saponified product thereof; polyvinylidene chloride; a vinylidene chloride copolymer; polystyrene; a styrene copolymer such as a copolymer of styrene and (meth)acrylic acid ester or a saponified product thereof; polyvinyl toluene; a vinyltoluene copolymer such as a copolymer of vinyltoluene and (meth)acrylic acid ester or a saponified product thereof; poly(meth)acrylic acid ester; a (meth)acrylic acid ester copolymer such as a copolymer of butyl(meth)acrylate and vinyl acetate; and a polyamide resin such as a vinyl acetate copolymer nylon, a copolymerized nylon, N-alkoxymethylated nylon, and N-dimethylaminated nylon.

(Delamination Layer)

The birefringent pattern builder used as a transferring material may include a delamination layer on the temporary support. The delamination layer controls the adhesion between the temporary support and the delamination layer or between the delamination layer and the layer laminated immediately above, and takes a role of helping the separation of the temporary support after the transfer of the optically anisotropic layer. The above-mentioned other functional layers such as the alignment layer and the dynamic property control layer may function as the delamination layer.

The transferring material preferably has an intermediate layer for the purpose of preventing mixing of the components during coating of a plurality of layers and during storage after the coating. The oxygen shut-off film having an oxygen shut-off function described as "separation layer" in JP-A-5-72724 or the above-described orientation layer for generating optical anisotropy is preferably used as the intermediate layer. Particularly preferably among them is a layer containing a mixture of polyvinylalcohol or polyvinylpyrrolidone and one or more derivatives thereof. One layer may work simultaneously as the above thermoplastic resin layer, oxygen shut-off layer, and alignment layer.

(Surface Protecting Layer)

A thin surface protecting layer is preferably provided on the resin layer for protecting the above layers against contamination or damage upon storage. The property of the surface protecting layer is not particularly limited and the surface protecting layer may be formed of the same or a similar material to that of the temporary support. The surface protecting layer should be readily separated from the layer adjacent thereto (for example an adhesive layer for transfer). As the material for the surface protecting layer, silicon paper, polyolefin, or polytetrafluoroethylene sheet is suitable.

The individual layers of the optically anisotropic layer, photosensitive resin layer, adhesive layer for transfer, and optionally-formed alignment layer, thermoplastic resin layer, dynamic property control layer, and intermediate layer can be formed by coating such as dip coating, air knife coating, spin coating, slit coating, curtain coating, roller coating, wire bar coating, gravure coating and extrusion coating (U.S. Pat. No. 2,681,294). Two or more layers may be coated simultaneously. Methods of simultaneous coating is described in U.S. Pat. Nos. 2,761,791, 2,941,898, 3,508,947, 3,526,528, and in "Kotingu Kogaku (Coating Engineering)", written by Yuji Harazaki, p. 253, published by Asakura Shoten (1973).

When the layer immediately above the optically anisotropic layer (for example, the adhesive layer for transfer) is applied to the optically anisotropic layer, the coating liquid may be added with a plasticizer or a photopolymerization initiator. Thereby, the modification of the layer may be conducted simultaneously by penetration of these additives.

(Method of Transferring Material to Target Material of Transfer)

Methods of transferring the transferring material on a target material of transfer are not specifically limited, so far as the optically anisotropic layer can be transferred onto the target material of transfer such as a support (substrate). For example, the transferring material in a film form may be attached so that the surface of the adhesive layer for transfer is faced to the surface of the target material of transfer, then pressing under heating or no-heating with rollers or flat plates, which are heated and/or pressed by a laminator. Specific examples of the laminator and the method of lamination include those described in JP-A-7-110575, JP-A-11-77942, JP-A-2000-334836 and JP-A-2002-148794, wherein the method described in JP-A-7-110575 is preferable in terms of low contamination.

Examples of the target material of transfer include a support, a laminated structure which is comprised of a support and another functional layer, and a birefringent pattern builder.

(Steps Included in Transfer)

The temporary support may be separated or not be separated after the transfer of a birefringent pattern builder on the target material of transfer. When the temporary support is not separated, the temporary support preferably has transparency suited for the light exposure afterwards and heat-resistance sufficient for surviving the baking step. A step for removing unwanted layers which has been transferred with the optically anisotropic layer may be included in the method. For example, when polyvinyl alcohol/polyvinylpyrrolidone copolymer is used in the alignment layer, the alignment layer and the layers above can be removed by development with an aqueous weak alkaline developing solution. Methods of the development may be any of known methods such as paddle development, shower development, shower-and-spin development and dipping development. The temperature of the developing solution is preferably 20° C. to 40° C., and pH of the developing solution is preferably 8 to 13.

Other layer may be formed on the surface remained after the separation of the temporary support or the removal of the unwanted layers, according to need. Another transferring material may be transferred on the surface remained after the separation of the temporary support or the removal of the unwanted layers, according to need. The transferring material may be the same or different from the previously transferred transferring material. Further, the slow axis of the optically anisotropic layer in the first transferred transferring material may be in the same or different direction from that of the slow axis of the optically anisotropic layer in the second transferred transferring material. As described above, transferring plural optically anisotropic layers is useful for production of a birefringence pattern having large retardation with plural optically anisotropic layers stacked so that the directions of the slow axes are the same, and a specific birefringence pattern with plural optically anisotropic layers stacked so that the directions of the slow axes are different to each other.

(Production of Patterned Birefringent Product)

By subjecting the birefringent pattern builder to at least (i) heating to heat at least a region thereof and (ii) a treatment to react at least a part of the unreacted reactive group, in this order, a product having a birefringent pattern can be prepared.

[Heating of Local Region (Writing of Heat Pattern)]

The heating temperature at the time of heating of a local region of the birefringent pattern builder is not limited and may be any temperature so long as the temperature causes a heated part and a non-heated part to have different retardations as described above. When a heated part desirably has retardation of substantially 0 nm in particular, it is preferred to conduct the heating at a temperature equal to or higher than the retardation disappearance temperature of the optically anisotropic layer of the birefringent pattern builder used. On the other hand, the heating temperature is preferably lower than a temperature at which the optically anisotropic layer is burned or colored. The heating may be generally performed at a temperature in a range from about 180° C. to about 260° C., more preferably in a range from 190° C. to 250° C., and further preferably in a range from 200° C. to 230° C.

Although the method of heating a part (region) of a birefringent pattern builder is not particularly limited, such methods may be used including a method of causing a heating body to have a contact with a birefringent pattern builder, a method of providing or placing a heating body in the close vicinity of a birefringent pattern builder, and a method of using a heat mode exposure to partially heat a birefringent pattern builder.

[Heating Using Heating Body]

A heating body may be a thermal head, a heat block, a hot stamp, or a thermal pen, for example. The thermal head, for example, is disclosed in JP-A-2004-9327 and JP-A-2004-25771, and the like.

[Attachment Preventing Layer]

When the heating is conducted by bringing a heating means to have a contact with a birefringent pattern builder, the birefringent pattern builder also preferably has an attachment preventing layer for preventing the birefringent pattern builder from being attached to these heat sources. The attachment preventing layer may be a layer consisting of binder, inorganic fine particles, lubricant, surfactant, or crosslinking agent, and the like.

The binder may be formed, for example, by water-soluble polymer such as polyvinyl alcohol, vinyl acetate/acrylamide copolymer, methylcellulose, carboxy methylcellulose, hydroxy methylcellulose, gelatines, polyvinylpyrrolidones, and polyacrylamide derivatives; and water-insoluble polymer such as styrene/butadiene rubber latex, acrylonitrile/butadiene rubber latex, and methyl acrylate/rubber latex.

Examples of the inorganic fine particle include, for example, colloidal silica, barium sulfate, zinc oxide, magnesium oxide, zirconium oxide, and alumina. The inorganic fine particle preferably has an average particle diameter of 0.01 μm to 0.25 μm.

Examples of the lubricant include zinc stearate, calcium stearate, paraffin wax, and polyethylene wax.

Examples of the surfactant include sulfosuccinic acid-based alkali metal salt and fluoride-containing surfactant (specifically, sodium salt or ammonium salt of di(2-ethylhexyl)sulfosuccinic acid, di(n-hexyl)sulfosuccinic acid).

Examples of the crosslinking agent include an epoxy compound, blocked isocyanate, a vinyl sulfone compound, an aldehyde compound, a methylol compound, boric acid, carboxylic anhydride, and a silane compound.

The attachment preventing layer can be formed by known coating methods including, for example, dip coating, air knife coating, spin coating, slit coating, curtain coating, roller coating, wire bar coating, and gravure coating.

[Heating Using Heat Mode Exposure]

The heating of a local region may also be conducted by heat mode exposure. In the following, the definition of heat mode exposure in the present invention will be described in detail.

As described in Hans-Joachim Timpe, IS&Ts NIP 15:1999 International Conference on Digital Printing Technologies, p. 209, it is known that when a photosensitive material forms an image through a process of photo excitation of a light absorbing material (e.g. dye) and via chemical or physical change, there are roughly two modes of the process from the light excitation to chemical or physical change. One mode is the so-called photon mode in which the optically excited light-absorbing material is inactivated by some opticochemical interactions (e.g., energy transfer and electron transfer) with other reactive materials in the photosensitive material, and the reactive materials thus activated causes chemical or physical change necessary for formation of images. The other mode is the so-called heat mode in which the optically excited light-absorbing material is inactivated by generating heat, and by this heat, other reactive materials cause chemical or physical change necessary for formation of images. Besides these modes, there are special modes such as abrasion wherein the materials explosively scatter due to topically collected light energy, and a mode in which one molecule absorb a large number of photons all at once, but the description of such modes is omitted in this specification.

The exposure processes utilizing the modes described above are called photon-mode exposure and heat-mode exposure, respectively. The technical difference between photon-mode exposure and heat mode exposure is whether or not the amount of energy of each exposed photon can be added up in order to initiate the desired reaction. For example, let us suppose that photons whose number is "n" are utilized to initiate a certain reaction. Because photochemical interaction is utilized in the photon-mode exposure, the energy of each photon cannot be added up so as to initiate the reaction because of the rule for conservation of quantum energy and momentum. To cause a certain reaction, therefore, the relationship "Energy of one photon Energy of the reaction" should be satisfied. In the heat-mode exposure, however, light excitation is followed by generation of heat and the heat thus converted from the light energy is utilized, the energy of each photon can be added up. Accordingly, the reaction can be initiated by satisfying the relationship "Energy of photons whose number is n Energy of the reaction". However, this addition of energy is limited by heat diffusion. That is, if the next light excitation-inactivation reaction occurs to generate heat before the previously generated heat is lost by heat diffusion from the exposed portion (reaction site), the heat is certainly accumulated and added up to thus raise the temperature of that portion. However, if the next generation of heat is delayed, the heat is lost and not accumulated. That is, in the heat-mode exposure, the accumulated energy which results from exposure with high-energy rays for a short time is different from that from exposure with low-energy rays for a long time, although the total energy of exposure in both cases is the same, and the latter case is advantageous for the accumulation of heat. As a matter of course, a similar phenomenon may occur also in the photon-mode exposure due to the effect of diffusion of the subsequently generated reaction species, though this generally does not occur in the photon-mode exposure.

That is, from the standpoint of the characteristics of the photosensitive material, the inherent sensitivity (i.e. energy for the reaction necessary for formation of image) of the photosensitive material in the photon mode is constant regardless of the exposure power density (w/cm$^2$) (=energy density per unit time), but the inherent sensitivity of the photosensitive material in the heat mode is increased in proportion to the exposure power density. Accordingly, if the image-recording material is exposed for a predetermined time which, from a practical perspective, is necessary to maintain productivity, the following comparison can be made. In the photon mode exposure, a high sensitivity can be easily achieved, but the reaction can occur at very low exposure, thus easily causing low-exposure fogging at the non-exposed portions. In the heat-mode exposure, on the other hand, the reaction does not occur unless the exposure amount is above a predetermined level, so that the problem of low-exposure fogging can be prevented. In fact, in the heat-mode exposure, the exposure power density of the plate surface of photosensitive material should be 5,000 w/cm$^2$ or more and preferably 10,000 w/cm$^2$ or more.

[Light Source for Heat Mode Exposure]

The heat mode exposure may be carried out by a light source such as a halogen lamp, laser or the like. However, since the high exposure density is required as described above, it is preferred to conduct scanning exposure using solid laser, gas laser, or semiconductor laser. The light source preferably has an irradiation wavelength peak in a range from 700 to 2,000 nm and more preferably in a range from 760 to 1,200 nm. A preferred peak wavelength of a light source can be influenced by an absorption wavelength of photothermal conversion agent (which will be described later). An exposure amount is generally about 50 to 1,000 mJ/cm$^2$, more preferably about 80 to 500 mJ/cm$^2$, and most preferably 100 to 250 mJ/cm$^2$.

[Photothermal Conversion Agent]

In a partial heating using the heat mode exposure, it is preferred that a photothermal conversion agent, which absorbs light of a predetermined wavelength and converts the light to heat, is present in the optically anisotropic layer. Any photothermal conversion agent may be used so long as the photothermal conversion agent has a function to convert absorbed light to heat. However, a preferred photothermal conversion agent has an absorption peak within an irradiation wavelength range of the light source used for the heat mode exposure. For example, when an infrared laser having a peak in a range from 760 to 1,200 nm is used as a light source, an infrared absorber having an absorption peak in a range from 760 to 1,200 nm is preferred. Examples of the photothermal conversion agent include dyes and pigments as shown below.

The dye may be any commercial dye including commercial dyes and known dyes described in literature (e.g. "Senryo Binran" (Dye Handbook) published in 1970 and compiled by Society of Synthetic Organic Chemistry, Japan). Specifically, can be mentioned are azo dyes, metal complex salt azo dyes, pyrazolone azo dyes, naphthoquinone dyes, anthraquinone dyes, phthalocyanine dyes, carbonium dyes, quinonimine dyes, methine dyes, cyanine dyes, squarylium pigments, pyrylium salts, and metal thiolate complex, for example.

Preferred examples of the dyes include the cyanine dyes described in JP-A-58-125246, JP-A-59-84356, JP-A-59-202829 and JP-A-60-78787; the methine dyes described in JP-A-58-173696, JP-A-58-181690 and JP-A-58-194595; the naphthoquinone dyes described in JP-A-58-112793, JP-A-58-224793, JP-A-59-48187, JP-A-59-73996, JP-A-60-52940, and JP-A-60-63744; the squarylium dyes described in JP-A-58-112792; and the cyanine dyes described in GB Patent No. 434,875.

Further, the near infrared-absorbing sensitizer described in U.S. Pat. No. 5,156,938 may be preferably used. Also preferably used are the aryl benzo(thio)pyrylium salts described in U.S. Pat. No. 3,881,924, the trimethine thiopyrylium salts described in JP-A-57-142645 (U.S. Pat. No. 4,327,169), the pyrylium type compounds described in JP-A-58-181051, JP-A-58-220143, JP-A-59-41363, JP-A-59-84248, JP-A-59-84249, JP-A-59-146063 and JP-A-59-146061, the cyanine dyes described in JP-A-59-216146, the pentamethine thiopyrylium salts described in U.S. Pat. No. 4,283,475, and the pyrylium compounds disclosed in JP-B-5-13514 and JP-B-5-19702.

Other preferable examples of dyes include the near infrared ray-absorbing dyes of general formulae (1) and (II) described in U.S. Pat. No. 4,756,993.

The pigments used preferably in the present invention, include commercial pigments and those described in Color Index (C. I.) Handbook, "Saishin Ganryo Binran" (Newest Pigment Handbook) (published in 1977 and compiled by Japanese Society of Pigment Technology), "Saishin Ganryo Oyo Gijyutsu" (Newest Pigment Applied Technology) (published in 1986 by CMC), and "Insatsu Inki Gijyutsu" (Printing Ink Technology) (published in 1984 by CMC).

Examples of the type of pigment include black pigments, yellow pigments, orange pigments, brown pigments, red pigments, violet pigments, blue pigments, green pigments, fluorescent pigments, metallic powder pigments, and other pigments such as polymer-binding pigments. Specifically, it is possible to use insoluble azo pigments, azo lake pigments, condensed azo pigments, chelate azo pigments, phthalocyanine type pigments, anthraquinone type pigments, perylene and perinone type pigments, thioindigo type pigments, quinacridone type pigments, dioxazine type pigments, isoindolinone type pigments, quinophthalone type pigments, dyed lake pigments, azine pigments, nitroso pigments, nitro pigments, natural pigments, fluorescent pigments, inorganic pigments, carbon black, or the like. A preferable pigment among those described above is carbon black.

These pigments may be used with or without being subjected to surface treatment. Examples of the surface treatment methods include coating the surface thereof with resin or wax, allowing a surfactant to adhere thereto, and bonding a reactive material (e.g., a silane coupling agent, an epoxy compound, a polyisocyanate etc.) onto the surface of the pigment. These surface treatment methods are described in "Kinzoku Sekken no Seishitsu to Oyo" (Properties and Application of Metallic Soap) (Sachi Shobo), "Insatsu Inki Gijyutsu" (Printing Ink Technology) (published in 1984 by CMC) and "Saishin Ganryho Oyo Gijyutsu" (Newest Pigment Applied Technology) (published in 1986 by CMC).

The particle diameters of the pigments are in the range of preferably 0.01 µm to 10 µm, more preferably 0.05 µm to 1 µm and most preferably 0.1 µm to 1 µm. A too-small particle diameter is not preferable in respect of the stability of dispersion in the optically anisotropic layer coating solution, whereas a too-large particle diameter is not preferable either in respect of the uniformity of the optically anisotropic layer.

As the method of dispersing the pigments, any known dispersion techniques used in production of inks or toners can be used. Examples of the dispersing machine include a supersonic dispersing device, sand mill, attritor, pearl mill, super mill, ball mill, impeller, disperser, KD mill, colloid mill, dynatron, triple roll mill, and press kneader. These are described in detail in "Saishin Ganryo Oyo Gijyutsu" (Newest Pigment Applied Technology) (published in 1986 by CMC).

These photothermal conversion agents may be added to the optically anisotropic layer or also may be added to another separately-provided layer. However, the photothermal conversion agent preferably allows, when a birefringent pattern builder is prepared, the layer to have an optical density of 0.1 to 3.0 at the absorption maximum in the range of 760 nm to 1,200 nm.

If the optical density is outside of this range, the sensitivity tends to be lowered. Because the optical density is determined by both the amount of the photothermal conversion agent added and the thickness of the optically anisotropic layer, the predetermined optical density can be achieved by regulating both conditions. The optical density of the optically anisotropic layer can be measured in a usual manner. For this measurement, there are, for example, a method where the optically anisotropic layer having a thickness after drying which is in a range determined suitable for the birefringent pattern builder, is formed on a transparent or white support and then measured by a transmission-type optical densitometer, and a method where the optically anisotropic layer is formed on a reflective support such as aluminum and measured for its reflection density.

[Treatment to React at Least a Part of Unreacted Reactive Group]

The "treatment to react at least a part of an unreacted reactive group" means a treatment which is conducted after the partial heating step and causes at least a part of unreacted reactive groups in the optically anisotropic layer to react. An expected effect of this treatment is to promote the crosslinking in the optically anisotropic layer, thereby to improve the durability and heat resistance of the birefringent pattern. This treatment may be performed to the entire area of the birefringent pattern builder.

Although the treatment to react at least a part of the unreacted reactive group is not particularly limited, examples of the treatment include the exposure of the entire surface and the heating of the entire surface. When the heating of the entire surface is performed, the heating of the entire surface is preferably performed at a temperature lower than that of the partial heating.

[Reaction Treatment by Exposure of Entire Surface]

The irradiation wavelength of a light source in the reaction treatment by the exposure of the entire surface preferably has a peak in a range from 250 to 450 nm and more preferably in a range from 300 to 410 nm. When a photosensitive resin layer is used to form different levels (unevenness) at the same time, it is also preferred that light in a wavelength region at which the resin layer can be cured (e.g., 365 nm, 405 nm) is irradiated to the resin layer. Specific examples of the light source include extra-high-pressure mercury lamp, high-pressure mercury lamp, metal halide lamp, and blue laser. Exposure amount generally falls in the range preferably from about 3 mJ/cm$^2$ to about 2,000 mJ/cm$^2$, more preferably from about 5 mJ/cm$^2$ to about 1,000 mJ/cm$^2$, and further preferably from about 10 mJ/cm$^2$ to about 500 mJ/cm$^2$, and most preferably from about 10 mJ/cm$^2$ to about 300 mJ/cm$^2$.

[Reaction Treatment by Heating of Entire Surface]

The reaction treatment by the heating of the entire surface may be performed at a temperature lower than the retardation disappearance temperature of the optically anisotropic layer of the birefringent pattern builder used. The reaction treatment by the heating of the entire surface may be generally performed at a temperature from about 120 to about 180° C., more preferably from 130 to 170° C., and further preferably from 140 to 160° C. However, this temperature may be appropriately determined based on a required birefringence (retardation) or the thermal curing responsiveness of the optically anisotropic layer used.

[Finishing Heat Treatment]

In the present invention, a finishing heat treatment may be performed for the purpose of further reacting unreacted reactive groups still remaining after the fixing of the pattern by the process for reacting at least a part of unreacted reactive groups, to increase the durability, and for the purpose of evaporating or burning an unnecessary component in the material, to remove the component. The finishing heat treatment may be performed at a temperature from about 180 to about 300° C., more preferably from 190 to 260° C., further preferably from 200 to 240° C.

[Lamination of a Plurality of Patterns]

To the laminated structure obtained by subjecting the birefringent pattern builder to the above respective steps including the partial heating, another transferring birefringent pattern builder may be transferred thereon, and then the above respective steps may be newly performed. The retardation values retained after baking can be effectively changed among the region which is a heated region both in the first and second heatings (generally having the lowest retardation value), the region which is a heated region in the first heating but a non-heated region in the second heating, the region which is a non-heated region in the first heating but a heated region in the second heating, and the region which is a non-heated region both in the first and second heatings (generally having the highest retardation value). In a similar manner, four or more regions can be readily formed, by conducting the aforementioned steps alternately three, four or more times. The above-mentioned technique is useful when the different regions desirably have a difference in the direction of optical axis or a very large difference in retardation.

(Functional Layer to be Laminated on Birefringence Pattern)

The birefringent pattern builder may be processed as described in the above to obtain birefringence pattern, which can be then laminated with functional layers with various functions to thereby obtain a patterned birefringent product. Examples of the functional layer include, but not specifically limited to, hardcoat layer for preventing damage or scratches on the surface, and reflective layer which renders the birefringence pattern readily visible. For an easy identification of the pattern, a reflective layer is particularly preferred to be provided under the birefringence pattern.

(Patterned Birefringent Product)

The product obtained from the birefringent pattern builder processed as described above is normally colorless and transparent, but when it is sandwiched by two polarizing plates, or by one polarizing plate and one reflective layer, the product exhibits characteristic contrast or color, and becomes readily identifiable with the naked eye. Using this property, the patterned birefringent product obtained by the above method can be used as, for example, means for preventing forgery. That is, the patterned birefringent product obtained by the method of the present invention, especially the patterned birefringent product having a reflective layer is normally almost invisible with the naked eye, whereas, through a polarizing plate, the patterned birefringent product can exhibit multi-colored image which can be readily identified. A photocopy of the birefringence pattern taken without any polarizing plate exhibits no image, whereas a photocopy through a polarizing plate exhibits a permanent pattern which is visible with the naked eye without using any polarizing plate. Therefore, the reproduction of the birefringence pattern is difficult. Such kind of method of producing birefringence pattern is not widely spread, and needs unusual or special kind of material. Therefore, the production method and product of the present invention can be considered to be favorably adapted as means of preventing forgery.

(Optical Element)

The patterned birefringent product obtained by the above method can be also used as an optical element. For example, when the patterned birefringent product obtained by the above method is used as a structural optical element, a particular optical element which exhibit effects only against a specific polarized light can be produced. As an example, a diffraction grating produced with the birefringence pattern according to the present invention functions as a polarization separation device which strongly diffracts a specific polarized light, and can be applied to as a projector or an optical communication device.

EXAMPLES

The present invention will be described in more detail based on the following examples. Any materials, reagents, amount and ratio of use and operations, as shown in the examples, may appropriately be modified without departing from the spirit and scope of the present invention. It is therefore understood that the present invention is by no means intended to be limited to the specific examples below.

Example 1

Preparation of Birefringence Pattern Using a Pattern-Writing by Heat and Ultraviolet Light Exposure (Preparation of Coating Liquid CU-1 for Dynamic Property Control Layer)

The composition below was prepared, filtered through a polypropylene filter having a pore size of 30 μm, and the filtrate was used as a coating liquid CU-1 for forming a dynamic property control layer.

| Composition of Coating Liquid for Dynamic Property Control Layer | (% by mass) |
| --- | --- |
| Methyl methacrylate/2-ethylhexyl acrylate/benzyl methacrylate/methacrylic acid copolymer (copolymerization ratio (molar ratio) = 55/30/10/5, weight-average molecular weight = 100,000, Tg: about 70° C.) | 5.89 |
| Styrene/acrylic acid copolymer (copolymerization ratio (molar ratio) = 65/35, weight-average molecular weight = 10,000, Tg: about 100° C.) | 13.74 |
| BPE-500 (trade name, manufactured by Shin-Nakamura Chemical Co., Ltd.) | 9.20 |
| Megafac F-780-F (manufactured by Dainippon Ink & Chemicals Incorporation) | 0.55 |
| Methanol | 11.22 |
| Propylene glycol monomethyl ether acetate | 6.43 |
| Methyl ethyl ketone | 52.97 |

(Preparation of Coating Liquid AL-1 for Alignment Layer)

The composition below was prepared, filtered through a polypropylene filter having a pore size of 30 μm, and the filtrate was used as a coating liquid AL-1 for forming an alignment layer.

| Composition of Coating Liquid for Alignment layer | (% by mass) |
| --- | --- |
| Polyvinyl alcohol (trade name: PVA205, manufactured by Kuraray Co., Ltd.) | 3.21 |
| Polyvinylpyrrolidone (trade name: Luvitec K30, manufactured by BASF) | 1.48 |
| Distilled water | 52.10 |
| Methanol | 43.21 |

(Preparation of Coating Liquid LC-1 for Optically Anisotropic Layer)

The composition below was prepared, filtered through a polypropylene filter having a pore size of 0.2 μm, and the filtrate was used as coating liquid LC-1 for forming an optically anisotropic layer.

LC-1-1 is a liquid crystalline compound having two reactive groups, one of which is acrylic group, i.e. a radically reactive group, and the other of which is oxetanyl group, i.e. a cationically reactive group.

LC-1-2 is a disk-shaped compound added for the purpose of orientation control. LC-1-2 was synthesized according to the method described in Tetrahedron Lett., Vol. 43, p. 6793 (2002).

| Composition of Coating Liquid for Optically Anisotropic Layer | (% by mass) |
| --- | --- |
| Rod-like liquid crystal (LC-1-1) | 32.59 |
| Horizontal orientation agent (LC-1-2) | 0.02 |
| Cationic photopolymerization initiator (trade name: CPI100-P, SAN-APRO Co., Ltd.) | 0.66 |
| Polymerization control agent (trade name: IRGANOX1076, Chiba Speciality Chemicals Co., Ltd.) | 0.07 |
| Methyl ethyl ketone | 66.67 |

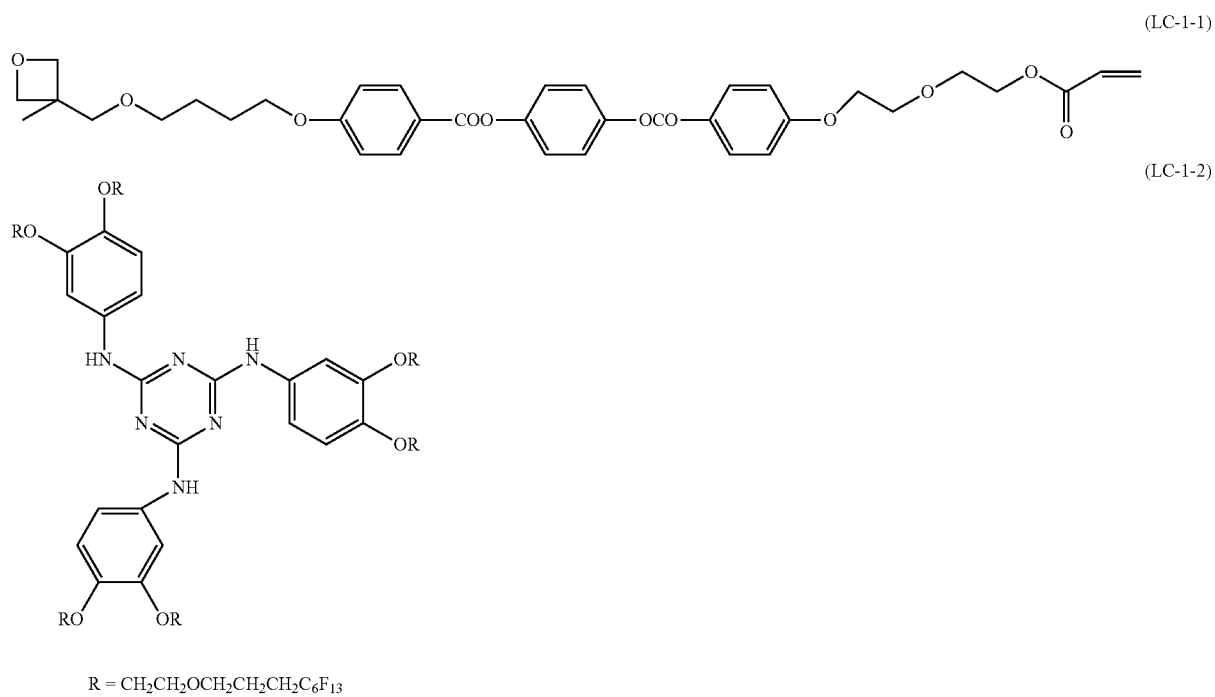

(Preparation of Coating Liquid AD-1 for Adhesive Layer for Transfer)

The composition below was prepared, filtered through a polypropylene filter having a pore size of 0.2 μm, and the filtrate was used as coating liquid AD-1 for forming an adhesive layer for transfer.

| Composition of Coating Liquid for Adhesive Layer for Transfer | (% by mass) |
|---|---|
| Random copolymer of benzyl methacrylate/methacrylic acid/methyl methacrylate (copolymerization ratio (molar ratio) = 35.9/22.4/41.7, weight-average molecular weight = 38,000) | 8.05 |
| KAYARAD DPHA (trade name, manufactured by Nippon Kayaku) | 4.83 |
| Radical polymerization initiator (2-trichloromethyl-5-(p-styrylstyryl)-1,3,4-oxadiazole) | 0.12 |
| Hydroquinone monomethyl ether | 0.002 |
| Megafac F-176PF (trade name, manufactured by Dainippon Ink & Chemicals Incorporation) | 0.05 |
| Propylene glycol monomethyl ether acetate | 34.80 |
| Methyl ethyl ketone | 50.538 |
| Methanol | 1.61 |

(Production of Sample TRC-1 coated with Optically Anisotropic Layer and Transferring Material TR-1 for Producing Birefringence Pattern)

To the surface of a temporary support formed of a 100-μm-thick polyethylene terephthalate film with easily adhesible property (COSMOSHINE A4100 (trade name) from Toyobo Co., Ltd.), the coating liquid for a dynamic property control layer, CU-1, and the coating liquid for an alignment layer, AL-1, in this order were applied by using a wire bar coater and dried. The obtained layers had dry film thickness of 14.6 μm and 1.6 μm, respectively. Next, the coating liquid for optically anisotropic layer, LC-1, was applied to the surface using a wire bar coater, dried under heating at 90° C. on the surface of the film for 2 minutes, to thereby obtain a layer of a liquid crystal phase. The coated layer was then illuminated in the air atmosphere by ultraviolet radiation by using a 160 mW/cm², air-cooled metal halide lamp (product of Eyegraphics Co., Ltd.), so as to fix the alignment state of the phase to thereby obtain a 1.5-μm-thick optically anisotropic layer. In this manner, a sample TRC-1 coated with the optically anisotropic layer was prepared. The ultraviolet ray used was 100 mW/cm² illuminance in the range of UV-A (integrated value in the wavelength between 320 nm and 400 nm), and 80 mJ/cm² irradiation energy in the range of UV-A. The optically anisotropic layer in the sample TRC-1 was formed of polymer which was solid at 20° C., and presented MEK (methyl ethyl ketone)-resistance.

Finally, the coating liquid for adhesive layer for transfer, AD-1, was applied to the topsurface of the sample TRC-1, dried to obtain an adhesive layer for transfer of 1.2-μm-thick, which was then pressure-bonded with a protective film (a 12-μm-thick polypropylene film), to thereby obtain a transferring material TR-1 for producing birefringence pattern.

(Production of Birefringent Pattern Builder BPM-1 of the Present Invention)

A non-alkali glass substrate was cleaned using a rotating nylon-haired brush while spraying a glass cleaner solution conditioned to 25° C. by a shower for 20 seconds. After showered with purified water, the substrate was sprayed with a silane coupling solution (0.3% aqueous solution of N-β-(aminoethyl)-γ-aminopropyl trimethoxysilane, trade name: KBM-603, Shin-Etsu Chemical Co., Ltd.) by a shower for 20 seconds, and then cleaned with a shower of purified water. The obtained substrate was then heated in a substrate preheating heater at 100° C. for 2 minutes.

The above-described transfer material for producing birefringence pattern TR-1, after being separated from its protective film, was laminated onto the substrate preheated at 100° C. for 2 minutes by using a laminator (product of Hitachi Industries Co., Ltd. (model Lamic II)) under a rubber roller temperature of 130° C., a line pressure of 100 N/cm, and a travel speed of 1.4 m/min. After the lamination, the temporary support was delaminated, to obtain the birefringent pattern builder BPM-1 of the present invention.

(Measurement of Retardation)

With respect to the birefringent pattern builder BPM-1, frontal retardation (Re (0)) of at a wavelength 550 nm was measured using a fiber-type spectrometer based on the parallel Nicol method. The result of the retardation measurement is shown in Table 1.

TABLE 1

| Sample | Re (0) |
|---|---|
| BPM-1 (This invention) | 143.2 |

(Preparation of Birefringence Pattern BP-1 Using Patterning by Hot Stamp and Fixation by Ultraviolet Radiation)

Next, the heat block I heated to about 200° C. was pushed to the birefringent pattern builder BPM-1 for 2 minutes. The shape of the used heat block I is shown in FIG. 4. The heat block was used by turning the heat block in a state as shown in FIG. 4 in the left-and-right direction, so that the convex part (the triangular shape in FIG. 4) would contact to the sample. The same applies to the other heat blocks mentioned later. The part to which the heat block was pushed was locally heated.

Then, ultraviolet light was irradiated to the entire sample by using an M-3L mask aligner manufactured by MIKASA, as to light-cure the entire sample, thereby obtaining the birefringence pattern BP-1. The ultraviolet light used had an illuminance of 20 mW/cm$^2$ in a range of UV-A (integrated value in the wavelength between 320 nm and 400 nm) and an irradiance level of 100 mJ/cm$^2$ in the range of UV-A. Table 2 shows the frontal retardations at a wavelength of 550 nm of the regions of the obtained sample heated or not heated by the heat block.

TABLE 2

| Sample | Re | |
|---|---|---|
| | Heated region | Non-heated region |
| BP-1 | 0.9 | 124.0 |

As shown in Table 2, the heated part showed a remarkably-declined retardation while the non-heated part showed a small change in the retardation. Specifically, by heating only a part of regions in the same manner as in this example, a birefringence pattern sample in which the retardation of an arbitrary region was significantly lowered can be obtained.

The pattern of the birefringence pattern BP-1 when viewed in a crossed Nicol state is shown in FIG. 5. In the Figure, the evenly black part is the part observed as black in a crossed Nicol state, and the part marked with diagonal lines is the part observed as gray in a crossed Nicol state.

In the specification, "in a crossed Nicol state" means a state wherein a sample is arranged between two polarizing plates which are stacked so that the absorption axes of them are about orthogonal to each other.

The birefringence pattern BP-1 was further subjected to a heat treatment at 230° C. for one hour. The each part of the pattern showed a small change in the phase difference that was within a 20 percent change before and after the heat treatment. This indicates that the birefringence pattern of the present invention has a superior heat resistance.

Example 2

Preparation of Birefringence Pattern Using Pattern Writing by Heat and Baking of Entire Surface (Preparation of Coating Liquid LC-2 for Optically Anisotropic Layer)

The composition below was prepared, filtered through a polypropylene filter having a pore size of 0.2 μm, and the filtrate was used as a coating liquid LC-2 for forming an optically anisotropic layer.

LC-2-1 is a liquid crystalline compound having two reactive groups, one of which is acrylic group, i.e. a radically reactive group, and the other of which is oxetanyl group, i.e. a cationically reactive group.

| Composition of Coating Liquid for Optically Anisotropic Layer | (% by mass) |
|---|---|
| Rod-like liquid crystal (LC-2-1) | 19.58 |
| Horizontal orientation agent (LC-1-2) | 0.02 |
| Cationic photopolymerization initiator (trade name. CPI100-P, SAN-APRO Co., Ltd.) | 0.40 |
| Methyl ethyl ketone | 80.00 |

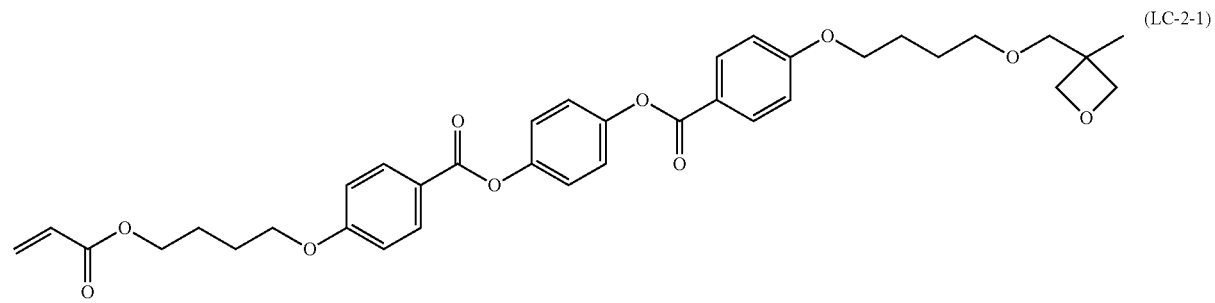

(LC-2-1)

(Production of Sample TRC-2 Coated with Optically Anisotropic Layer and Transferring Material TR-2 for Producing Birefringence Pattern)

To the surface of a temporary support formed of a 100-μm-thick polyethylene terephthalate film with easily adhesible property (COSMOSHINE A4100 (trade name) from Toyobo Co., Ltd.), the coating liquid for a dynamic property control layer, CU-1, and the coating liquid for an alignment layer, AL-1, in this order were applied by using a wire bar coater and dried. The obtained layers had dry film thickness of 14.6 μm and 1.6 μm, respectively. Next, the coating liquid for optically anisotropic layer, LC-2, was applied to the surface using a wire bar coater, dried under heating at a film surface temperature of 105° C. for 2 minutes, to thereby obtain a layer of a liquid crystal phase. The coated layer was then illuminated in the air atmosphere by ultraviolet radiation by using a 160 mW/cm², air-cooled metal halide lamp (product of Eyegraphics Co., Ltd.), so as to fix the alignment state of the phase to thereby obtain a 2,0-μm-thick optically anisotropic layer. In this manner, a sample TRC-2 coated with the optically anisotropic layer was prepared. The ultraviolet ray used was 100 mW/cm² illuminance in the range of UV-A (integrated value in the wavelength between 320 nm and 400 nm), and 80 mJ/cm² irradiation energy in the range of UV-A. The optically anisotropic layer in the sample TRC-2 was formed of polymer which was solid at 20° C., and presented MEK (methyl ethyl ketone)-resistance.

Finally, the coating liquid for adhesive layer for transfer, AD-1, was applied to surface of the sample TRC-2, dried to obtain an adhesive layer for transfer of 1.2-μm-thick, which was then pressure-bonded with a protective film (a 12-μm-thick polypropylene film), to thereby obtain transferring material TR-2 for producing birefringence pattern.

(Production of Birefringent Pattern Builder BPM-2)

A non-alkali glass substrate was cleaned using a rotating nylon-haired brush while spraying a glass cleaner solution conditioned to 25° C. by a shower for 20 seconds. After showered with purified water, the substrate was sprayed with a silane coupling solution (0.3% aqueous solution of N-β-(aminoethyl)-γ-aminopropyl trimethoxysilane, trade name: KBM-603, Shin-Etsu Chemical Co., Ltd.) by a shower for 20 seconds, and then cleaned with a shower of purified water. The obtained substrate was then heated in a substrate preheating heater at 100° C. for 2 minutes.

The above-described transfer material for producing birefringence pattern TR-2, after being separated from its protective film, was laminated onto the substrate preheated at 100° C. for 2 minutes by using a laminator (product of Hitachi Industries Co., Ltd. (model Lamic II)) under a rubber roller temperature of 130° C., a line pressure of 100 N/cm, and a travel speed of 1.4 m/min. After the lamination, the temporary support was delaminated, to obtain the birefringent pattern builder BPM-2 of the present invention.

(Measurement of Retardation)

With respect to the birefringent pattern builder BPM-2, frontal retardation (Re (0)) of at a wavelength 550 nm was measured using a fiber-type spectrometer based on the parallel Nicol method. The result of the retardation measurement is shown in Table 3.

TABLE 3

| Sample | Re (0) |
|---|---|
| BPM-2 (This invention) | 213.2 |

(Measurement of Retardation Disappearance Temperature)

The retardation disappearance temperature of the birefringent pattern builder BPM-2 was measured by an observation with an Eclipse E600Pol polarizing microscope manufactured by NIKON CORPORATION while being heated on a hot stage manufactured by METTLER with a temperature increase rate of 20° C./minute from the room temperature to 250° C. The measurement showed a value of 174° C.

(Preparation of Birefringence Pattern BP-2 by Patterning by Hot Stamp and Fixation by Baking of Entire Surface)

Next, the heat block I heated to about 200° C. was pushed to the birefringent pattern builder BPM-2 for 3 minutes. The part to which the heat block was pushed was locally heated.

Then, the birefringence pattern BP-2 was baked in a clean oven for one hour to cause the entire sample to thermally-cure, thereby obtaining the birefringence pattern BP-2. This baking was performed at a baking temperature of 160° C. that was lower than the retardation disappearance temperature of 174° C. of the sample of the birefringent pattern builder BPM-2. Table 4 shows the frontal retardations at a wavelength of 550 nm of the regions of the obtained sample heated or not heated by the heat block.

TABLE 4

| Sample | Re | |
|---|---|---|
| | Heated region | Non-heated region |
| BP-2 | 2.4 | 198.0 |

As shown in Table 4, the heated part showed a remarkably-declined retardation while the non-heated part showed a small change in the retardation. Specifically, by performing the heating at an appropriate temperature, instead of the ultraviolet light exposure as in Example 1, a birefringence pattern sample in which the retardation of an arbitrary region was significantly lowered was obtained as in Example 1.

The pattern of the above sample when viewed in a crossed Nicol state is shown in FIG. 6. In the Figure, the evenly black part is the part observed as black in a crossed Nicol state, and the part marked with diagonal lines is the part observed as pale yellow in a crossed Nicol state.

Example 3

Preparation of Birefringence Pattern Obtained by Laminating a Plurality of Different Patterns (Preparation of Transferring Material TR-3 for Preparing Birefringence Pattern)

The transferring material TR-3 for preparing a birefringence pattern was prepared in the same manner as TR-1, except that the thickness of the optically anisotropic layer was changed to 2.4 μm.

(Preparation of Laminated Birefringence Pattern BP-3 of Present Invention)

A non-alkali glass substrate was cleaned using a rotating nylon-haired brush while spraying a glass cleaner solution conditioned at 25° C. by a shower for 20 seconds. After showered with purified water, the substrate was sprayed with a silane coupling solution (0.3% aqueous solution of N-β-(aminoethyl)-γ-aminopropyl trimethoxysilane, trade name: KBM-603, Shin-Etsu Chemical Co., Ltd.) by a shower for 20 seconds, and then cleaned with a shower of purified water. The obtained substrate was then heated in a substrate preheating heater at 100° C. for 2 minutes.

The above-described transfer material for producing birefringence pattern TR-1, after being separated from its protective film, was laminated onto the substrate preheated at 100° C. for 2 minutes by using a laminator (product of Hitachi Industries Co., Ltd. (model Lamic II)) under a rubber roller temperature of 130° C., a line pressure of 100 N/cm, and a travel speed of 1.4 m/min.

After the lamination, the temporary support was delaminated, and then the heat block II heated to about 200° C. was pushed to the resultant substrate for two minutes, to perform a local heating. The shape of the heat block II used is shown in FIG. 7.

Then, the sample was entirely subjected to an ultraviolet irradiation in the range of UV-A with illuminance of 20 mW/cm$^2$ and an exposure amount of 100 ml/cm$^2$ with the M-3L mask aligner manufactured by MIKASA, thereby fixing the pattern.

Then, to the substrate as irradiated above, the transferring material TR-3 for preparing birefringence pattern was laminated in the same manner as described in the above. At this, a care was taken so that the slow axis of the optically anisotropic layer of the previously-laminated TR-1 would be in the same direction as that of the slow axis of this laminated TR-3.

After the lamination, the temporary support was peeled off, and the heat block III heated to about 200° C. was pushed for three minutes to the substrate, to perform a local heating. The shape of the used heat block III is shown in FIG. 8.

Then, the sample was entirely subjected to an ultraviolet irradiation in the same manner as described in the above, with using the M-3L mask aligner manufactured by MIKASA.

Finally, the sample was subjected to a heat treatment as a finishing heat treatment for one hour in a clean oven at 230° C., thereby preparing the laminated birefringence pattern BP-3 of the present invention.

Table 5 shows the results of the measurement of the frontal retardation Re at a wavelength of 550 nm with regard to the non-heated part of the sample, the part heated only by the heat block II, the part heated only by the heat block III, and the part heated by both of the blocks.

TABLE 5

| | Re | | | |
|---|---|---|---|---|
| Sample | Part heated by two blocks | Part heated by block II | Part heated by block III | Non-heated part |
| BP-2 | 1.7 | 201.2 | 126.5 | 317.6 |

As can be seen from the result shown in Table 5, different retardation values are obtained at the non-heated part of the sample, the part heated by the heat block II, the part heated by the heat block III, and the part heated by both of the blocks.

The pattern of the above sample when viewed in a crossed Nicol state is shown in FIG. 9.

In the Figure, the evenly black part is a part observed as black in a crossed Nicol state, the parts marked with diagonal lines are the parts observed as gray in a crossed Nicol state, the part marked with vertical lines is the part observed as pale yellow in a crossed Nicol state, and the part marked with grid lines is the part observed as deep yellow in a crossed Nicol state. By repeatedly performing a cycle of transfer, pattern heating, and fixation (photofixation in this example) as described above, a laminated structure of layers having different birefringence patterns can be easily obtained.

REFERENCE SIGNS IN THE DRAWINGS

Figure 1:
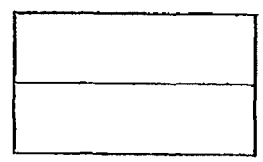
FIGS. 1(*a*) to 1(*i*) are schematic sectional views showing examples of the birefringent pattern builder.
Figure 1:
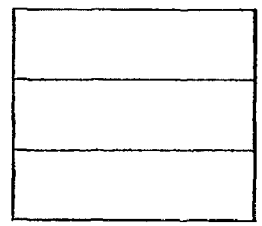
Figure 1:
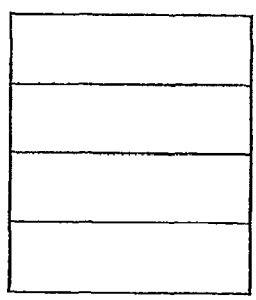
Figure 1:
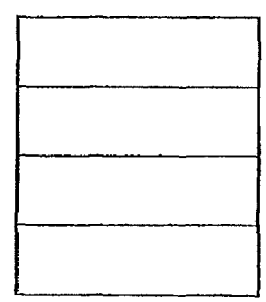
Figure 1:
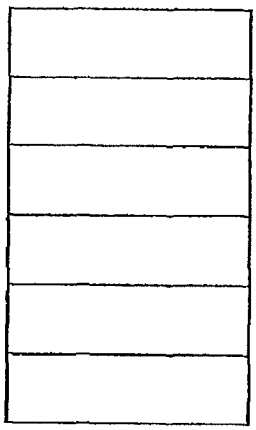
Figure 1:
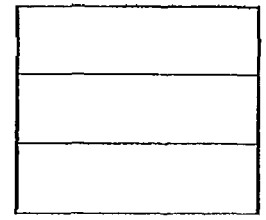
Figure 1:
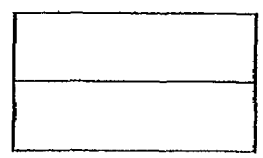
Figure 1:
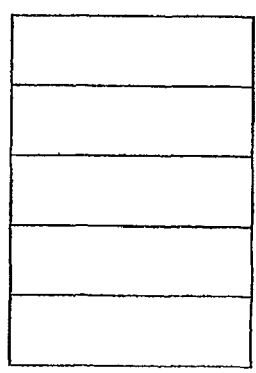
Figure 1:
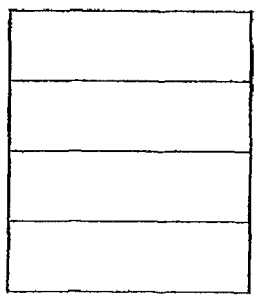
Figure 2:
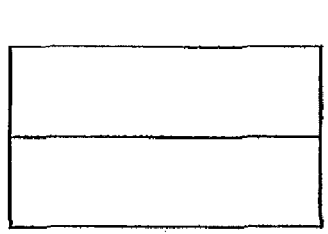
FIGS. 2(*a*) to 2(*f*) are schematic sectional views showing examples of the birefringent pattern builder which are used as a transferring material.
Figure 2:
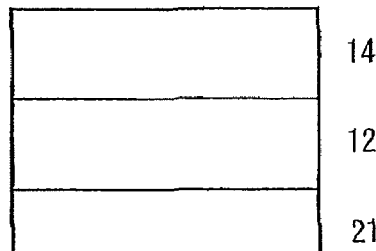
Figure 2:
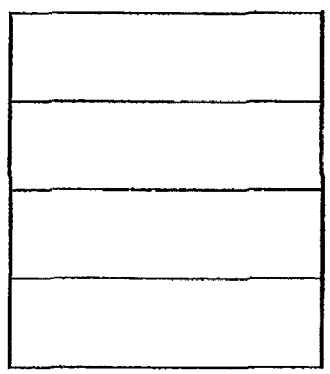
Figure 2:
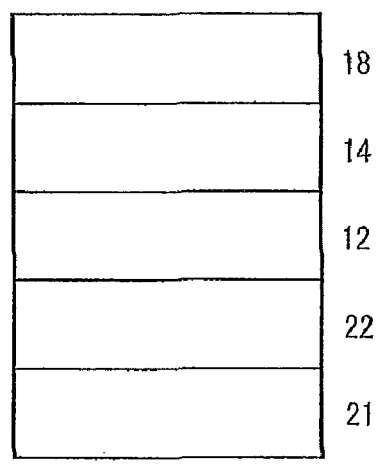
Figure 2:
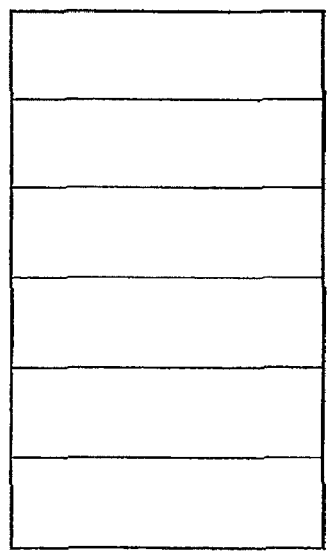
Figure 2:
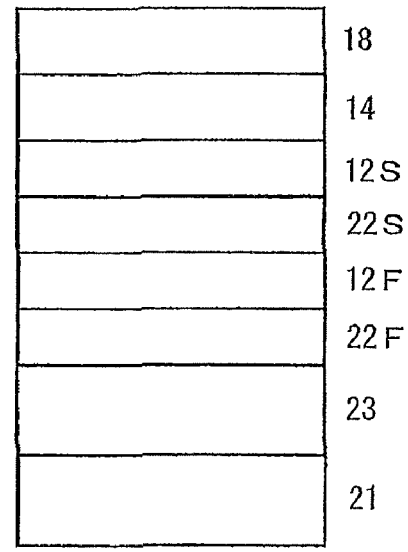
Figure 3:
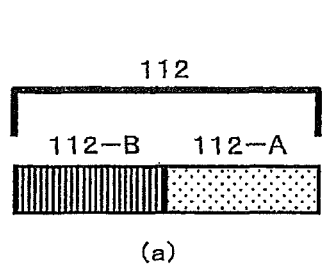
FIGS. 3(*a*) to 3(*d*) are schematic sectional views showing examples of patterned birefringent products which are obtainable by the method of the present invention.
Figure 3:
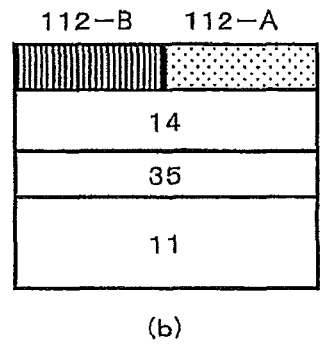
Figure 3:
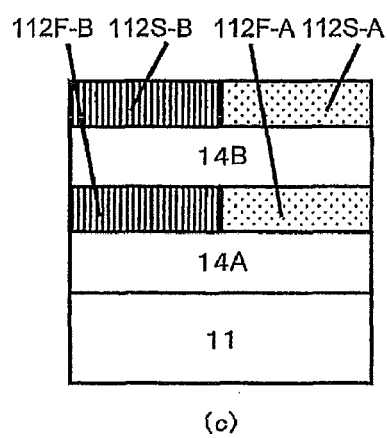
Figure 3:
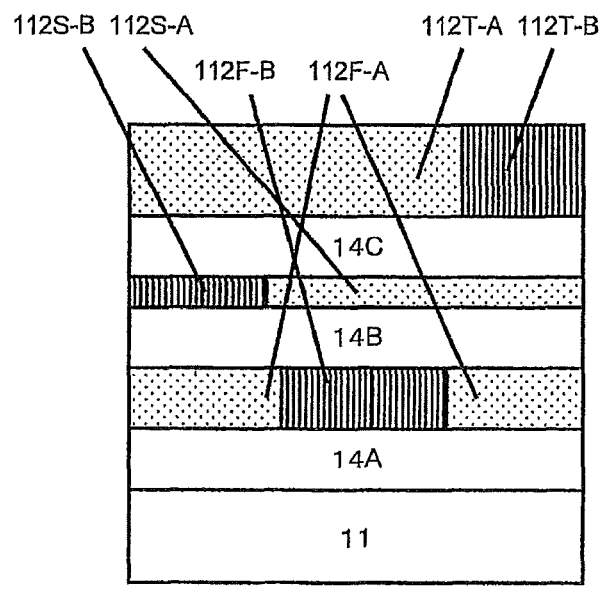
Figure 4:
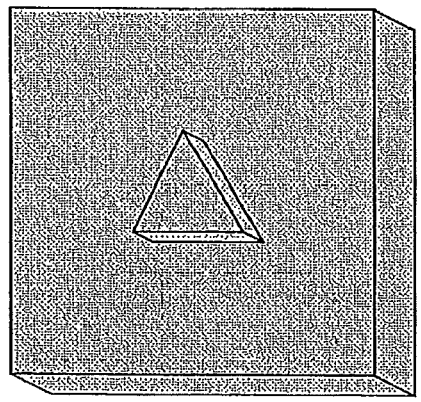
FIG. 4 illustrates the shape of the heat block I used in Example 1.
Figure 5:
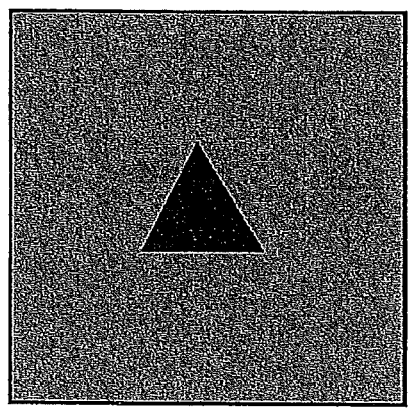
FIG. 5 is a view showing a frame format of the pattern of the sample prepared in Example 1 when it is viewed in a crossed Nicol state.
Figure 6:
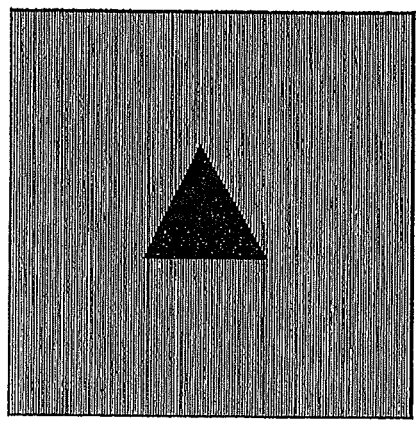
FIG. 6 is a view showing a frame format of the pattern of the sample prepared in Example 2 when it is viewed in a crossed Nicol state.
Figure 7:
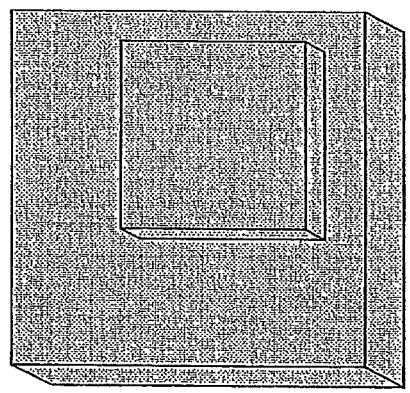
FIG. 7 illustrates the shape of the heat block II used in Example 3.
Figure 8:
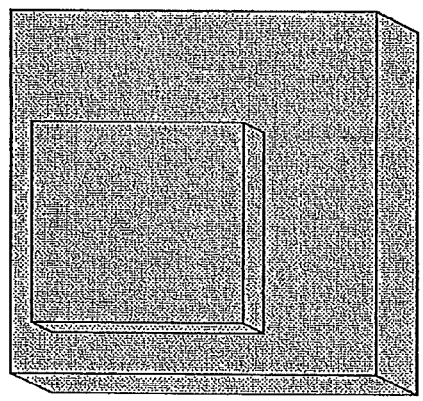
FIG. 8 illustrates the shape of the heat block III used in Example 3.
Figure 9:
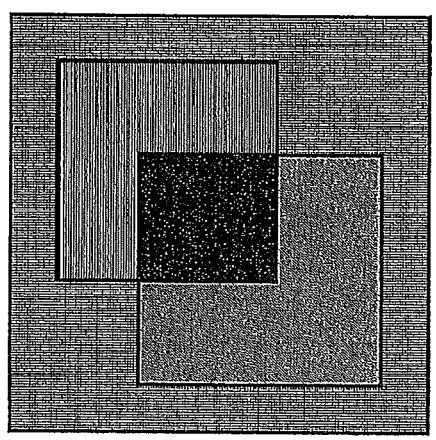
FIG. 9 is a view showing a frame format of the pattern of the sample prepared in Example 3 when it is viewed in a crossed Nicol state.

11 Support or substrate
12 Optically anisotropic layer
12F First optically anisotropic layer
12S Second optically anisotropic layer
13 Alignment layer (on support or substrate)
14 Adhesive layer for transfer
14A First adhesive layer for transfer
14B Second adhesive layer for transfer
14C Third adhesive layer for transfer
16 Post-adhesive layer
17 Delamination layer
18 Surface-protecting layer
21 Temporary support
22 Alignment layer (on temporary support)
22F First alignment layer on temporary support
22S Second alignment layer on temporary support
23 Dynamic property control layer
35 Reflective layer
112 Patterned optically anisotropic layer
112-A Patterned optically anisotropic layer (heated region)
112-B Patterned optically anisotropic layer (non-heated region)
112F-A First patterned optically anisotropic layer (heated region of first layer)
112F-B First patterned optically anisotropic layer (non-heated region of first layer)
112S-A Second patterned optically anisotropic layer (heated region of second layer)
112S-B Second patterned optically anisotropic layer (non-heated region of second layer)
112T-A Third patterned optically anisotropic layer (heated region of third layer)
112T-B Third patterned optically anisotropic layer (non-heated region of third layer)

Having described our invention as related to the present embodiments, it is our intention that the invention not be limited by any of the details of the description, unless otherwise specified, but rather be construed broadly within its spirit and scope as set out in the accompanying claims.

This non-provisional application claims priority under 35 U.S.C. §119(a) on Patent Application No. 2008-069827 filed in Japan on Mar. 18, 2008, which is entirely herein incorporated by reference.

The invention claimed is:

1. A method of producing a patterned birefringent product, comprising at least steps (I) to (III) in this order:
   (I) providing a birefringent pattern builder having an optically anisotropic layer containing a polymer having unreacted reactive groups, which is a layer formed by coating and drying a solution including a liquid crystalline compound having two or more kinds of reactive groups having different polymerization conditions, to thereby form a liquid crystal phase, and then polymerizing and fixing the compound by applying heat or irradiating ionizing radiation;
   (II) heating a region of the birefringent pattern builder at 180 to 260° C., thereby to transform the optically anisotropic layer into a patterned optically anisotropic layer; and
   (III) subjecting the birefringent pattern builder to a process that reacts at least a part of the unreacted reactive groups in the optically patterned anisotropic layer.

2. The method as claimed in claim 1, wherein the optically anisotropic layer has a retardation disappearance temperature in a temperature region higher than 20° C., where the retardation disappearance temperature being a temperature at which an in-plane retardation is 30% or less of an in-plane retardation at 20° C., and the temperature at the heating in the step (II) is equal to or higher than the retardation disappearance temperature.

3. The method as claimed in claim 1, wherein the heating is performed by a contact of a heating body.

4. The method as claimed in claim 2, wherein the process in the step (III) is exposure.

5. The method as claimed in claim 2, wherein the process in the step (III) is a heating treatment.

6. The method as claimed in claim 5, wherein the optically anisotropic layer has a retardation disappearance temperature in a temperature region higher than 20° C., where the retardation disappearance temperature being a temperature at which an in-plane retardation is 30% or less of an in-plane retardation at 20° C., and the heating treatment in the step (III) is performed at a temperature lower than the retardation disappearance temperature.

7. The method as claimed in claim 2, wherein the step (III) is followed by a step of performing a finishing heat treatment of the birefringent pattern builder.

8. The method as claimed in claim 1, wherein the liquid crystalline compound at least has a radically reactive group and a cationically reactive group.

9. The method as claimed in claim 8, wherein the radically reactive group is an acrylic group and/or a methacrylic group, and the cationically reactive group is a vinyl ether group, an oxetanyl group, and/or an epoxy group.

10. The method as claimed in claim 8, wherein the birefringent pattern builder in the step (I) comprises:
    the optically anisotropic layer formed by coating a solution including the liquid crystalline compound and only a radical photo-polymerization initiator as a photoreactive polymerization initiator, to thereby form a liquid crystal phase, and then polymerizing and fixing the compound by applying heat or irradiating ionizing radiation; and
    a functional layer provided by directly coating a solution including a cationic photo-polymerization initiator, on the optically anisotropic layer.

11. The method as claimed in claim 8, wherein the birefringent pattern builder in the step (I) comprises:
    the optically anisotropic layer formed by coating a solution including the liquid crystalline compound and only a cationic photo-polymerization initiator as a photoreactive polymerization initiator, to thereby form a liquid crystal phase, and then polymerizing and fixing the compound by applying heat or irradiating ionizing radiation; and
    a functional layer provided by directly coating a solution including a radical photo-polymerization initiator, on the optically anisotropic layer.

12. The method as claimed in claim 2, wherein the optically anisotropic layer is a stretched film.

13. The method as claimed in claim 2, wherein the step (I) is performed by transferring a transferring material including an optically anisotropic layer, over a target material of transfer, to prepare the birefringent pattern builder.

14. The method as claimed in claim 13, wherein the transferring material includes a temporary support, an optically anisotropic layer, and an adhesive layer for transfer, in this order.

* * * * *